(12) United States Patent
Kohda et al.

(10) Patent No.: US 6,711,322 B1
(45) Date of Patent: Mar. 23, 2004

(54) OPTICAL SWITCH, OPTICAL-FIBER-ARRAYING-MEMBER, PRODUCTION METHOD THEREOF, AND ARRAYING METHOD OF OPTICAL FIBERS

(75) Inventors: Hiroshi Kohda, Yokohama (JP); Kazuhito Saito, Yokohama (JP); Takeo Komiya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/763,803

(22) PCT Filed: May 12, 1999

(86) PCT No.: PCT/JP99/02450
§ 371 (c)(1),
(2), (4) Date: Feb. 27, 2001

(87) PCT Pub. No.: WO00/14586
PCT Pub. Date: Mar. 16, 2000

(30) Foreign Application Priority Data

Sep. 9, 1998 (JP) .......... P10-255543
Sep. 17, 1998 (JP) .......... P10-263221
Sep. 18, 1998 (JP) .......... P10-264498

(51) Int. Cl.[7] .......... G02B 6/35; G02B 6/26
(52) U.S. Cl. .......... 385/22; 385/16; 385/25
(58) Field of Search .......... 385/25, 26, 20, 385/21, 22, 16, 17, 36

(56) References Cited

U.S. PATENT DOCUMENTS

| | | | |
|---|---|---|---|
| 4,223,978 A | | 9/1980 | Kummer et al. |
| 4,896,935 A | * | 1/1990 | Lee .......... 385/22 |
| 4,991,922 A | * | 2/1991 | Dahlgren .......... 385/50 |
| 5,317,659 A | * | 5/1994 | Lee .......... 385/20 |
| 5,446,810 A | * | 8/1995 | Watanabe et al. .......... 385/137 |

FOREIGN PATENT DOCUMENTS

| | | | |
|---|---|---|---|
| EP | 61-185715 | 8/1986 | |
| FR | 2 521 735 | 8/1983 | |
| FR | 2521735 A | 8/1983 | |
| FR | 2634030 A | 1/1990 | |
| FR | 2634030 A1 * | 1/1990 | .......... G02B/6/24 |
| JP | 52-49848 | 4/1977 | |
| JP | 52049848 A * | 4/1977 | .......... G02B/5/14 |
| JP | 53-109650 | 9/1978 | |
| JP | 54-68649 | 6/1979 | |
| JP | 61-185715 | 8/1986 | |
| JP | 61185715 A * | 8/1986 | .......... G02B/26/08 |
| JP | 5-241084 | 9/1993 | |
| JP | 5-241085 | 9/1993 | |
| JP | 05241085 A * | 9/1993 | .......... G02B/26/08 |
| JP | 07-027986 | 1/1995 | |
| JP | 07-043623 | 2/1995 | |
| JP | 9-197303 | 7/1997 | |
| JP | 09197303 A * | 7/1997 | .......... G02B/26/08 |
| TW | 85201068 | 1/1996 | |

* cited by examiner

*Primary Examiner*—John D. Lee
*Assistant Examiner*—Daniel Valencia
(74) *Attorney, Agent, or Firm*—McDermott, Will & Emery

(57) ABSTRACT

An optical switch is provided with an optical-fiber-arraying-member 1 in which a plurality of optical fiber fixing grooves 1a extending along radial directions of a virtual circle are radially formed in a predetermined surface of a base material, a plurality of array-side optical fibers 2 arrayed in the plurality of optical fiber fixing grooves 1a of the optical-fiber-arraying-member 1, and a moving-side optical fiber 4 to be selectively optically connected to either of the plurality of array-side optical fibers 2; the moving-side optical fiber 4 and the optical-fiber-arraying-member 1 are rotated relative to each other about a center axis 1o of the virtual circle, and the moving-side optical fiber 4 is selectively optically connected to the array-side optical fiber 2 selected.

30 Claims, 22 Drawing Sheets

OPTICAL SWITCH, OPTICAL-FIBER-ARRAYING-MEMBER, PRODUCTION METHOD THEREOF, AND ARRAYING METHOD OF OPTICAL FIBERS

TECHNICAL FIELD

The present invention relates to an optical-fiber-arraying-member that can be used in selective connection between optical fibers, a production method thereof, an arraying method of optical fibers, and an optical switch.

BACKGROUND ART

Optical switches have been used heretofore as devices for selectively connecting a small number of optical fibers to a large number of optical fibers in line connection tests, circuit tests, etc. in optical fiber communication lines.

For example, U.S. Pat. No. 5,446,810 discloses an optical switch having an optical fiber arranging member of a flat plate shape in which a plurality of optical fiber fixing grooves for optical fibers to be placed therein are formed in parallel on a flat plate. This optical switch is constructed in such structure that array-side optical fibers are placed in the respective fiber fixing grooves of the optical fiber arranging member, and that a carrying mechanism moves a moving-side optical fiber to selectively connect the moving-side optical fiber to an array-side optical fiber.

The optical switch provided with the optical fiber arranging member as described in the above U.S. Pat. No. , however, had the following problems. For arranging a number of optical fibers in the structure wherein the optical fiber fixing grooves for the optical fibers to be placed therein were formed in parallel on the flat plate as described above, the size of the optical fiber arranging member had to be increased. Further, the moving-side optical fiber needed to be translationally moved by use of expensive ball screw, linear guide, and so on in order to selectively connect the moving-side optical fiber to either of the array-side optical fibers arrayed in parallel, and there arose problems of high cost and complexity of the carrying mechanism with increase in the size of the optical fiber arranging member.

In the optical switch described in the above U.S. Pat. No. 5,446,810, a plurality of optical fiber arranging members are arranged vertically in order to decrease the size in the optical fiber array direction of the optical fiber arranging members. This structure, however, necessitates a mechanism for moving the moving-side optical fiber in the vertical direction in order to selectively connect the moving-side optical fiber to either of the array-side optical fibers, which makes the carrying mechanism of the moving-side optical fiber more complex.

DISCLOSURE OF THE INVENTION

The present invention has been accomplished under such circumstances and an object of the invention is to provide an optical switch that permits compactification and simplification of the mechanism for selectively optically connecting the optical fibers, an optical-fiber-arraying-member, a production method thereof, and an arraying method of optical fibers.

An optical switch according to the present invention is an optical switch comprising: an optical-fiber-arraying-member in which a plurality of optical fiber fixing grooves extending along radial directions of a virtual circle are radially formed in a predetermined surface of a base material; a plurality of array-side optical fibers arrayed in the plurality of optical fiber fixing grooves of the optical-fiber-arraying-member; and a moving-side optical fiber to be selectively optically connected to either of the plurality of array-side optical fibers, wherein the moving-side optical fiber and the optical-fiber-arraying-member are rotated relative to each other about a center axis of the virtual circle to select the array-side optical fiber optically to be connected to the moving-side optical fiber.

With the optical switch according to the present invention, since the moving-side optical fiber is optically connected to the array-side optical fiber by rotating the moving-side optical fiber and the optical-fiber-arraying-member with the plurality of optical fiber fixing grooves radially formed, relative to each other about the center axis of the virtual circle, the moving-side optical fiber does not have to be moved in parallel in the array direction of the array-side optical fibers, different from the optical switch using the optical-fiber-arraying-member of the type in which a plurality of optical fiber fixing grooves are formed in parallel on a flat plate. This permits compactification and simplification of the mechanism for selectively optically connecting the optical fibers.

In the optical switch of the present invention, it is preferable that the optical switch comprise a carrying device for carrying the moving-side optical fiber, and an arraying-member rotating device for rotating the optical-fiber-arraying-member and that the moving-side optical fiber be optically connected to the array-side optical fiber by the carrying device and the arraying-member rotating device.

Further, the optical switch of-the present invention may also be constructed so that the base material is of a prism shape, the plurality of optical fiber fixing grooves are radially formed in at least two side faces of the base material, the base material and the moving-side optical fiber are rotated relative to each other about a center axis of the prism to select one side face of the base material, and the moving-side optical fiber is optically connected to either of the array-side optical fibers arrayed on said one side face selected.

In this case, a lot of array-side optical fibers can be arrayed, because the optical fiber fixing grooves are formed in a plurality of side faces of the prism. Since a side face of the base material with the array of array-side optical fibers to be optically connected is selected by simply rotating the base material and the moving-side optical fiber relative to each other, it becomes feasible to implement compactification and simplification of the mechanism for selectively optically connecting the optical fibers.

In this case, it is also preferable that the optical switch comprise base-material rotating means for rotating the base material about the center axis of the prism, a carrying device for carrying the moving-side optical fiber, and a moving-side-fiber rotating device for rotating the moving-side optical fiber about the center axis of the virtual circle and that the moving-side optical fiber be optically connected to the array-side optical fiber by the base-material rotating means, the carrying device, and the moving-side-fiber rotating device.

Further, the optical switch of the present invention may also be constructed so that the base material is of a pyramid shape, the plurality of optical fiber fixing grooves are radially formed in at least two side faces of the base material, the base material and the moving-side optical fiber are rotated relative to each other about a center axis of the pyramid to select one side face of the base material, and the moving-side optical fiber is optically connected to either of the array-side optical fibers arrayed on said one side face selected.

In this case, a lot of array-side optical fibers can be arrayed, because the optical fiber fixing grooves are formed in a plurality of side faces of the pyramid. Since a side face of the base material with the array of array-side optical fibers to be optically connected is selected by simply rotating the base material and the moving-side optical fiber relative to each other, it becomes feasible to implement compactification and simplification of the mechanism for selectively optically connecting the optical fibers.

In this case, it is also preferable that the optical switch comprise base-material rotating means for rotating the base material about the center axis of the pyramid, a carrying device for carrying the moving-side optical fiber, and a moving-side-fiber rotating device for rotating the moving-side optical fiber about the center axis of the virtual circle and that the moving-side optical fiber be optically connected to the array-side optical fiber by the base-material rotating means, the carrying device, and the moving-side-fiber rotating device.

Another optical switch according to the present invention is an optical switch comprising an optical-fiber-arraying-member in which a plurality of optical fiber fixing grooves are formed along a direction of a generator of a cylindrical side face of a base material, which has one of the cylindrical side surface and part of the cylindrical side surface as its own side face; a plurality of array-side optical fibers arrayed in the plurality of optical fiber fixing grooves of the optical-fiber-arraying-member; and a moving-side optical fiber to be selectively optically connected to either of the plurality of array-side optical fibers, wherein the moving-side optical fiber and the optical-fiber-arraying-member are rotated relative to each other about a center axis of the cylinder and the moving-side optical fiber is optically connected to the array-side optical fiber.

With the optical switch according to the present invention, since the moving-side optical fiber is optically connected to the array-side optical fiber by rotating the moving-side optical fiber and the optical-fiber-arraying-member with the plurality of optical fiber fixing grooves formed along the generator direction of the cylindrical side face, relative to each other about the center axis of the cylinder, the to moving-side optical fiber does not have to be moved in parallel in the array direction of the array-side optical fibers, different from the optical switch using the optical-fiber-arraying-member of the type in which a plurality of optical fiber fixing grooves are formed in parallel on a flat plate. This permits the compactification and simplification of the mechanism for selectively optically connecting the optical fibers.

In the present invention, it is preferable that the optical fiber comprise a carrying device for carrying the moving-side optical fiber, and an arraying-member rotating device for rotating the optical-fiber-arraying-member about the center axis of the cylinder and that the moving-side optical fiber be selectively optically connected to the array-side optical fiber by the carrying device and the arraying-member rotating device.

Another optical switch according to the present invention is an optical switch comprising: an optical-fiber-arraying-member in which a plurality of optical fiber fixing grooves are formed along directions of a generator of a conical side face of a base material, which has one of the conical side face and part of the conical side face as its own side face; a plurality of array-side optical fibers arrayed in the plurality of optical fiber fixing grooves of the optical-fiber-arraying-member; and a moving-side optical fiber to be selectively optically connected to either of the plurality of array-side optical fibers, wherein the moving-side optical fiber and the optical-fiber-arraying-member are rotated relative to each other about a center axis of the cone and the moving-side optical fiber is selectively optically connected to the array-side optical fiber.

With the optical switch according to the present invention, since the moving-side optical fiber is optically connected to the array-side optical fiber by rotating the moving-side optical fiber and the optical-fiber-arraying-member with the plurality of optical fiber fixing grooves formed along the generator directions of the conical side face, relative to each other about the center axis of the cone, the moving-side optical fiber does not have to be moved in parallel in the array direction of the array-side optical fibers, different from,the optical switch using the optical-fiber-arraying-member of the type in which a plurality of optical fiber fixing grooves are formed in parallel on a flat plate. This permits the compactification and simplification of the mechanism for selectively optically connecting the optical fibers.

In the present invention, it is also desirable that the optical switch comprise a carrying device for carrying the moving-side optical fiber, and an arraying-member rotating device for rotating the optical-fiber-arraying-member about the center axis of the cone and that,the moving-side optical fiber be selectively optically connected to the array-side optical fiber by the carrying device and the arraying-member rotating device.

An optical-fiber-arraying-member according to the present invention is an optical-fiber-arraying-member wherein a plurality of optical fiber fixing grooves extending along radial directions of a virtual circle are radially formed in a predetermined surface of a base material.

The optical-fiber-arraying-member according to the present invention-can be used in the optical switch for selectively optically connecting the moving-side optical fiber to either of the array-side optical fibers arrayed in the optical fiber fixing grooves. With the optical switch according to the present invention, the moving-side optical fiber can be optically connected to the array-side optical fiber by rotating the optical-fiber-arraying-member and the moving-side optical fiber relative to each other about the center axis of the virtual circle. This obviates the need for the parallel movement of the moving-side optical fiber along the array direction of the array-side optical fibers, different from the configuration using the optical-fiber-arraying-member of the type wherein a plurality of optical fiber fixing grooves are formed in parallel on a flat plate. This permits the compactification and simplification of the mechanism for selectively optically connecting the optical fibers.

The optical-fiber-arraying-member of the present invention may also be constructed so that the base material is of a prism shape and a plurality of optical fiber fixing grooves are radially formed in at least two side faces of the base material.

In this case, a lot of array-side optical fibers can be arrayed, because the optical fiber fixing grooves are formed in a plurality of side faces of the prism. When this optical-fiber-arraying-member is used in the optical switch, it becomes feasible to implement the compactification and simplification of the mechanism for selectively optically connecting the optical fibers, because a side face of the base material with the array of array-side optical fibers to be optically connected is selected by simply rotating the base material and the moving-side optical fiber relative to each other.

The optical-fiber-arraying-member of the present invention may also be constructed so that the base material is of a pyramid shape and a plurality of optical fiber fixing grooves are radially formed in at least two side faces of the base material.

In this case, a lot of many array-side optical fibers can be arrayed, because the optical fiber fixing grooves are formed in a plurality of side faces of the pyramid. When this optical-fiber-arraying-member is used in the optical switch, it becomes feasible to implement the compactification and simplification of the mechanism for selectively optically connecting the optical fibers, because a side face of the base material with the array of array-side optical fibers to be optically connected is selected by simply rotating the base material and the moving-side optical fiber relative to each other.

Another optical-fiber-arraying-member according to the present invention is an optical-fiber-arraying-member comprising a base material having one of a cylindrical side face and part of the cylindrical side face as its own side face, wherein a plurality of optical fiber fixing grooves are formed along a direction of a generator of the cylindrical side face of the base material.

The optical-fiber-arraying-member according to the present invention can be used in the optical switch for selectively optically connecting the moving-side optical fiber to either of the array-side optical fibers arrayed in the optical fiber fixing grooves. With the optical switch according to the present invention, the moving-side optical fiber can be optically connected to the array-side optical fiber by rotating the optical-fiber-arraying-member and the moving-side optical fiber relative to each other about the center axis of the cylinder. This obviates the need for the parallel movement of the moving-side optical fiber along the array direction of the array-side optical fibers, different from the configuration using the optical-fiber-arraying-member of the type wherein a plurality of optical fiber fixing grooves are formed in parallel on a flat plate. This permits the compactification and simplification of the mechanism for selectively optically connecting the optical fibers.

Another optical-fiber-arraying-member according to the present invention is an optical-fiber-arraying-member comprising a base material having one of a conical side face and part of the conical side face as its own side face, wherein a plurality of optical fiber fixing-grooves are formed along directions of a generator of the conical side face of the base material.

The optical-fiber-arraying-member according to the present invention can be used in the optical switch for selectively optically connecting the moving-side optical fiber to either of the array-side optical fibers arrayed in the optical fiber fixing grooves. With the optical switch according to the present tag invention, the moving-side optical fiber can be optically connected to the array-side optical fiber by rotating the optical-fiber-arraying-member and the moving-side optical fiber relative to each other about the center axis of the cone. This obviates the need for the parallel movement of the moving-side optical fiber along the array direction of the array-side optical fibers, different from the configuration using the optical-fiber-arraying-member of the type wherein a plurality of optical fiber fixing grooves are formed in parallel on a flat plate. This permits the compactification and simplification of the mechanism for selectively optically connecting the optical fibers.

A production method of the optical-fiber-arraying-member according to the present invention is a method of producing an optical-fiber-arraying-member, comprising a process of alternately repeating plural times a step of forming an optical fiber fixing groove in a predetermined surface of a base material by linearly moving a cutting tool along a radial direction of a virtual circle and a step of rotating the base material and the moving direction of the cutting tool relative to each other by a predetermined angle about a center axis of the virtual circle, thereby radially forming a plurality of optical fiber fixing grooves in the base material.

Another production method of the optical-fiber-arraying-member according to the present invention is a method of producing an optical-fiber-arraying-member, comprising a process of alternately repeating plural times a step of forming an optical fiber fixing groove with a stamp member having a groove-forming rib by pushing the groove-forming rib against a predetermined surface of a base material along a radial direction of a virtual circle and a step of rotating an extending direction of the groove-forming rib of the stamp member and the base material relative to each other by a predetermined angle about a center axis of the virtual circle, thereby radially forming a plurality of optical fiber fixing grooves in the base material.

By these production methods of the optical-fiber-arraying-member with the cutting tool or with the stamp member, the optical-fiber-arraying-member is produced in the structure in which the plurality of optical fiber fixing grooves extending along the radial directions of the virtual circle are radially formed in the predetermined surface of the base material. When this optical-fiber-arraying-member is used, for example, in the optical switch, the moving-side optical fiber can be optically connected to the array-side optical fiber by simply rotating the optical-fiber-arraying-member and the moving-side optical fiber relative to each other about the center axis of the virtual circle, which permits the compactification and simplification of the mechanism for selectively optically connecting the optical fibers.

The above production method of the optical-fiber-arraying-member with the cutting tool may also be arranged so that the base material is of a prism shape and the base material and the cutting tool are rotated relative to each other about a center axis of the prism to determine a side face of the base material in which the optical fiber fixing grooves are to be formed. Further, the above production method of the optical-fiber-arraying-member with the stamp member may also be arranged so that the base material is of a prism shape and the base material and the stamp member are rotated relative to each other about a center axis of the prism to determine a side face of the base material in which the optical fiber fixing grooves are to be formed.

In these cases, one side face of the base material is selected by rotating the base material and the cutting tool or the stamp member relative to each other about the center axis of the prism and the optical fiber fixing grooves can be formed in the side face thus selected. If another side face of the base material is again selected by rotating the base material and the cutting tool or the stamp member relative to each other about the center axis of the prism, the optical fiber fixing grooves can be formed in a plurality of side faces.

The above production method of the optical-fiber-arraying-member with the cutting tool may also be arranged so that the base material is of a pyramid shape and the base material and the cutting tool are rotated relative to each other about a center axis of the pyramid to determine a side face of the base material in which the optical fiber fixing grooves are to be formed. The above production method of the optical-fiber-arraying-member with the stamp member may also be arranged so that the base material is of a pyramid shape and the base material and the stamp member are rotated relative to each other about a center axis of the pyramid to determine a side face of the base material in which the optical fiber fixing grooves are to be formed.

In these cases, one side face of the base material is selected by rotating the base material and the cutting tool or the stamp member relative to each other about the center axis of the pyramid and the optical fiber fixing grooves can be formed in the side face thus selected. If another side face of the base material is again selected by rotating the base material and the cutting tool or the stamp member relative to each other about the center axis of the pyramid, the optical fiber fixing grooves can be formed in a plurality of side faces.

Another production method of the optical-fiber-arraying-member according to the present invention is a method of producing an optical-fiber-arraying-member, comprising a process of alternately repeating plural times a step of moving a cutting tool along a direction of a generator of a cylindrical side surface of a base material, which has one of the cylindrical side face and part of the cylindrical side face as its own side face, to form an optical-fiber fixing groove in the base material and a step of rotating the cutting tool and the base material relative to each other by a predetermined angle about a center axis of the cylinder, thereby forming a plurality of optical fiber fixing grooves parallel to each other on the cylindrical side face of the base material.

Another production method of the optical-fiber-arraying-member according to the present invention is a method of producing an optical-fiber-arraying-member, comprising a process of alternately repeating plural times a step of forming an optical fiber fixing groove with a stamp member having a groove-forming rib by pushing the groove-forming rib along a direction of a generator of a cylindrical side face of a base material, which has one of the cylindrical side face and part of the cylindrical side face as its own side face and a step of rotating the stamp member and the base material relative to each other by a predetermined angle about a center axis of the cylinder, thereby forming a plurality of optical fiber fixing grooves parallel to each other in the cylindrical side face of the base material.

By these production methods of the optical-fiber-arraying-member with the cutting tool or with the stamp member, the optical-fiber-arraying-member is produced in the structure in which the plurality of optical fiber fixing grooves extending along the generator direction of the cylindrical side face of the base material are formed in parallel. When this optical-fiber-arraying-member is used, for example, in the optical switch, the moving-side optical fiber can be optically connected to the array-side optical fiber by simply rotating the optical-fiber-arraying-member and the moving-side optical fiber relative to each other about the center axis of the cylinder, which permits the compactification and simplification of the mechanism for selectively optically connecting the optical fibers.

Another production method of the optical-fiber-arraying-member according to the present invention is a method of producing an optical-fiber-arraying-member, comprising a process of alternately repeating plural times a step of linearly moving a cutting tool along one direction of a base material to form an optical fiber fixing groove in a predetermined surface of the base material and a step of moving the moving direction of the cutting tool and the base material relative to each other in a direction perpendicular to the one direction, thereby forming a plurality of optical fiber fixing grooves parallel to each other in the base material, wherein bottoms of the respective fiber fixing grooves are located on a side face of a virtual cylinder.

By the-production method of the optical-fiber-arraying-member according to the present invention, the optical-fiber-arraying-member is formed in the structure in which the bottoms of the respective fiber fixing grooves are located on the side face of the virtual cylinder. When this optical-fiber-arraying-member is used, for example, in the optical switch, the moving-side optical fiber can be optically connected to the array-side optical fiber by simply rotating the optical-fiber-arraying-member and the moving-side optical fiber relative to each other about the center axis of the virtual cylinder, which permits the compactification and simplification of the mechanism for selectively optically connecting the optical fibers.

Another production method of the optical-fiber-arraying-member according to the present invention is a method of producing an optical-fiber-arraying-member, comprising a process of forming a plurality of optical fiber fixing grooves in a surface of a base material of a flat plate shape and thereafter deforming the base material so that a surface of the base material becomes part of a side face of a cylinder.

By the production method of the optical-fiber-arraying-member according to the present invention, the bottoms of the respective fiber fixing grooves can be formed so as to be located on the side face of the cylinder. When this optical-fiber-arraying-member is used, for example, in the optical switch, the moving-side optical fiber can be optically connected to the array-side optical fiber by simply rotating the optical-fiber-arraying-member and the moving-side optical fiber relative to each other about the center axis of the cylinder, which permits the compactification and simplification of the mechanism for selectively optically connecting the optical fibers.

Another production method of the optical-fiber-arraying-member according to the present invention is a method of producing an optical-fiber-arraying-member, comprising a process of alternately repeating plural times a step of moving a cutting tool along a direction of a generator of a conical side face of a base material, which has one of the conical side face and part of the conical side face as its own side face, to form an optical fiber fixing groove in the base material and a step of rotating the cutting tool and the base material relative to each other by a predetermined angle about a center axis of the cone, thereby forming a plurality of optical fiber fixing grooves on the conical side face of the base material.

Another production method of the optical-fiber-arraying-member according to the present invention is a method of producing an optical-fiber-arraying-member, comprising a process of alternately repeating plural times a step of forming an optical fiber fixing groove with a stamp member having a groove-forming rib by pushing the groove-forming rib along a direction of a generator of a conical side face of a base material, which has one of the conical side face and part of the conical side face as its own side face and a step of rotating the stamp member and the base material relative to each other by a predetermined angle about a center axis of the cone, thereby forming a plurality of optical fiber fixing grooves in the conical side face of the base material.

By these production methods of the optical-fiber-arraying-member with the cutting tool or with the stamp member, the optical-fiber-arraying-member is produced in the structure in which the plurality of optical fiber fixing grooves extending along the generator directions of the conical side face of the base material are radially formed. When this optical-fiber-arraying-member is used, for example, in the optical switch, the moving-side optical fiber can be optically connected to the array-side optical fiber by simply rotating the optical-fiber-arraying-member and the moving-side optical fiber relative to each other about the center axis of the cone, which permits the compactification and simplification of the mechanism for selectively optically connecting the optical fibers.

An arraying method of optical fibers according to the present invention is a method of arraying optical fibers, comprising: a step of preparing an optical-fiber-arraying-member in which a plurality of optical fiber fixing grooves extending along radial directions of a virtual circle are radially formed in a predetermined surface of a base material; a step of arraying and fixing a plurality of array-side optical fibers to be optically connected to a moving-side optical fiber, in the plurality of optical fiber fixing grooves; and a step of rotating a cylindrical edge of a cylindrical shape about a center axis of the virtual circle to cut ends of the plurality of array-side optical fibers to align the ends.

By the arraying method of optical fibers according to the present invention, the plurality of array-side optical fibers are radially arrayed on the base material. For this reason, the moving-side optical fiber is selectively optically connected to either of these array-side optical fibers by simply rotating the optical-fiber-arraying-member and the moving-side optical fiber relative to each other about the center axis of the virtual circle, which permits the compactification and simplification of the mechanism for selectively optically connecting the optical fibers. Further, the ends of the array-side optical fibers can readily be cut to be aligned by simply rotating the cylindrical edge about the center axis of the virtual circle.

In the arraying method of optical fibers according to the present invention, it is preferable that the base material be of a prism shape, that the plurality of optical fiber fixing grooves be radially formed in at least two side faces of the base material, that the base material and the cylindrical edge be rotated relative to each other about a center axis of the prism to select one side face, and ends of the array-side optical fibers arrayed on the one side face selected be cut to be aligned by the cylindrical edge.

By the arraying method of optical fibers according to the present invention, one side face of the base material is selected by rotating the base material and the cylindrical edge relative to each other about the center axis of the prism and the ends of the array-side optical fibers arrayed on the side face selected can be cut to be aligned by the cylindrical edge. If then another side of the base material is again selected by rotating the base material and the cylindrical edge relative to each other about the center axis of the prism, the ends of the array-side optical fibers arrayed on another side face can also be cut to be aligned.

In the arraying method of optical fibers according to the present invention, it is preferable that the base material be of a pyramid shape, that the plurality of optical fiber fixing grooves be radially formed in at least two side faces of the base material, that the base material and the cylindrical edge be rotated relative to each other about a center axis of the pyramid to select one side face, and ends of the array-side optical fibers arrayed on said one side face selected be cut to be aligned by the cylindrical edge.

By the arraying method of optical fibers according to the present invention, one side face of the base material is selected by rotating the base material and the cylindrical edge relative to each other about the center axis of the pyramid and the ends of the array-side optical fibers arrayed on the side face selected can be cut to be aligned by the cylindrical edge. If then another side of the base material is again selected by rotating the base material and the cylindrical edge relative to each other about the center axis of the pyramid, the ends of the array-side optical fibers arrayed on another side face can also be cut to be aligned.

Another arraying method of optical fibers according to the present invention is a method of arraying optical fibers, comprising: a step of preparing an optical-fiber-arraying-member in which a plurality of optical fiber fixing grooves extending along a direction of a generator of a cylindrical side face of a base material, which has one of the cylindrical side face and part of the cylindrical side face as its own side face, are formed in parallel to each other; a step of arraying and fixing a plurality of array-side optical fibers to be optically connected to a moving-side optical fiber, in the plurality of optical fiber fixing grooves; and a step of rotating a rotary blade having a rotation axis parallel to a center axis of the cylinder and rotating the base material and the rotary blade relative to each other about the center axis of the cylinder, thereby cutting ends of the plurality of array-side optical fibers to align the ends.

By the arraying method of optical fibers according to the present invention, the plurality of array-side optical fibers are arrayed in parallel along the generator direction of the cylindrical side face of the base material. For this reason, the moving-side optical fiber can be selectively optically connected to either of these array-side optical fibers by simply rotating the optical-fiber-arraying-member and the moving-side optical fiber relative to each other about the center axis of the cylinder, which permits the compactification and simplification of the mechanism for selectively optically connecting the optical fibers. Further, the ends of the array-side optical fibers can be readily cut to be aligned by simply rotating the base material and the rotary blade relative to each other about the center axis of the cylinder.

Another arraying method of optical fibers according to the present invention is a method of arraying optical fibers, comprising: a step of preparing an optical-fiber-arraying-member in which a plurality of optical fiber fixing grooves extending along directions of a generator of a conical side face of a base material, which has one of the conical side face and part of the conical side face as its own side face, are formed; a step of arraying and fixing a plurality of array-side optical fibers to be optically connected to a moving-side optical fiber, in the plurality of optical fiber fixing grooves; and a step of rotating a rotary blade having a rotation axis parallel to a center axis of the cone and rotating the base material and the rotary blade relative to each other about the center axis of the cone, thereby cutting ends of the plurality of array-side optical fibers to align the ends.

By the arraying method of optical fibers according to the present invention, the plurality of array-side optical fibers are arrayed along the generator directions of the conical side face of the base material. For this reason, the moving-side optical fiber can be selectively optically connected to either of these array-side optical fibers by simply rotating the optical-fiber-arraying-member and the moving-side optical fiber relative to each other about the center axis of the cone, which permits the compactification and simplification of the mechanism for selectively optically connecting the optical fibers. Further, the ends of the array-side optical fibers can readily be cut to be aligned by simply rotating the base material and the rotary blade relative to each other about the center axis of the cone.

BEST MODE FOE CARRYING OUT THE INVENTION

Preferred embodiments of the optical switch, the optical-fiber-arraying-member, the production method of the optical-fiber-arraying-member, and the arraying method of optical fibers according to the present invention will be described hereinafter in detail with reference to the accompanying drawings. It is noted that the same elements will be denoted by the same reference symbols and redundant description will be omitted.

First Embodiment

Figure 1:
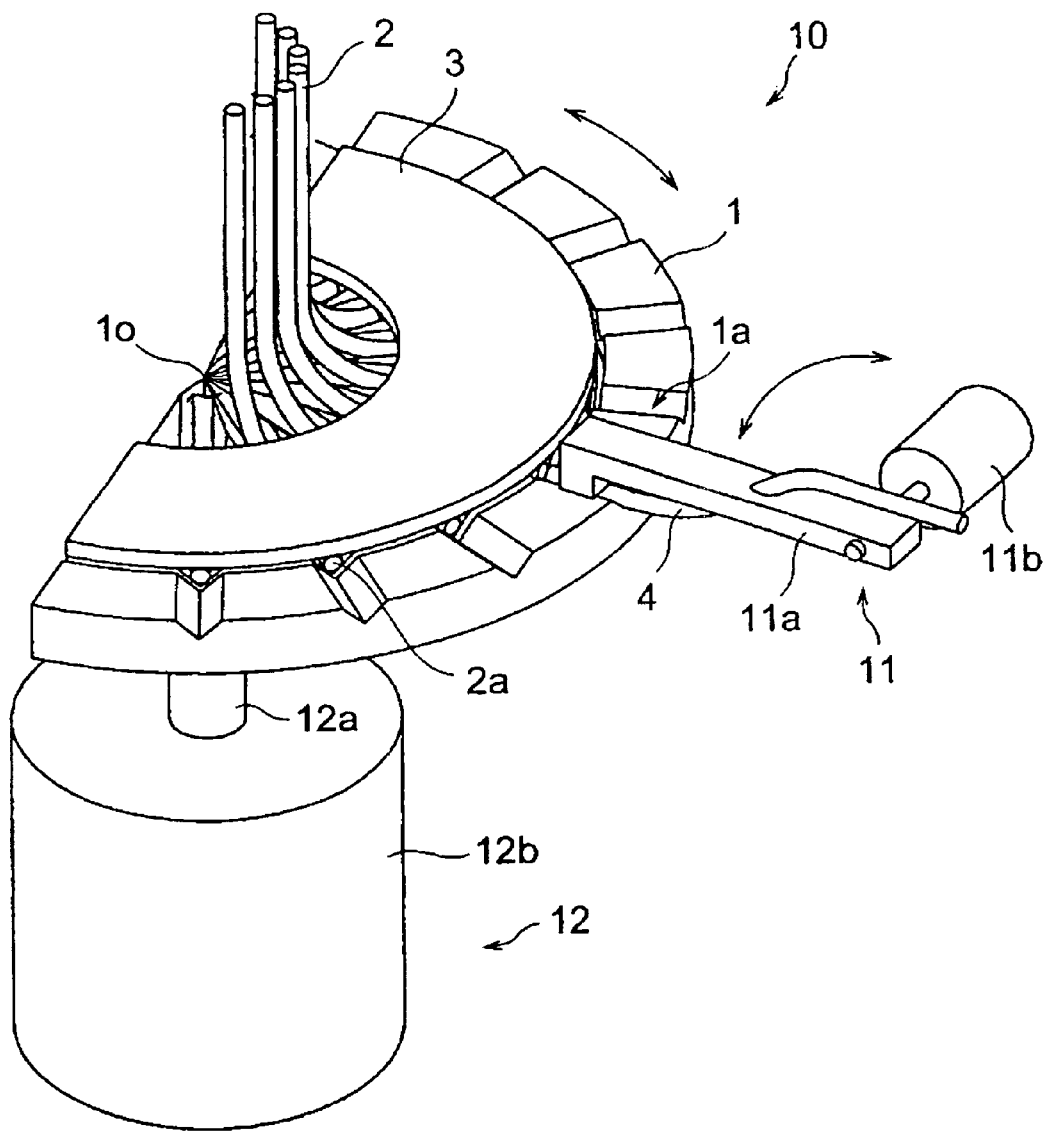
FIG. 1 is a diagram to show a first embodiment of the optical switch according to the present invention.

FIG. 1 is a diagram to show the first embodiment of the optical switch according to the present invention. The optical switch 10 of the present embodiment is mainly comprised of an optical-fiber-arraying-member 1 of a semicircular shape in which optical fiber fixing grooves 1a are radially formed, a plurality of array-side optical fibers 2 arrayed in the respective fiber fixing grooves 1a, a fixing member 3 for fixing each array-side optical fiber 2 with pushing it against the optical-fiber-arraying-member 1, a moving-side optical fiber 4 to be optically connected to either of the array-side optical fibers 2, a rotating device (carrying device) 11 for rotating the moving-side optical fiber 4, and an arraying-member rotating device 12 for rotating the optical-fiber-arraying-member 1. The term "optically connected" means a feasible state of optical communication in which the end face of a moving-side optical fiber 4 is opposed to the end face of the array-side optical fiber 2 so as to be ready for optical communication, and means that they do not always have, to be in physical contact with each other.

The optical-fiber-arraying-member 1 is made of a material that allows formation of the optical fiber fixing grooves 1a, such as synthetic resin, glass, silicon, ceramic, and so on. The cross-sectional shape of the optical fiber fixing grooves 1a is the V-shape and the axes of the grooves are radially arranged so as to be directed toward the center lo of an arc of the optical-fiber-arraying-member 1. The array-side optical fibers 2 are arrayed so that their fiber end faces 2a are directed to the outside on the same circumference, i.e., in directions going away from the center axis of the optical-fiber-arraying-member 1, and are pressed and fixed near the distal ends thereof by the fixing member 3 of the ring shape.

The rotating device 11 for rotating the moving-side optical fiber 4 includes a support member 11a functioning to support the moving-side optical fiber 4 and to push it against the optical-fiber-arraying-member 1, and a motor 11b for rotating the support member 11a. The arraying-member rotating device 12 for rotating the optical-fiber-arraying-member 1 includes a rotational support shaft 12a for supporting the optical-fiber-arraying-member 1 and a motor 12b for rotating the rotational support shaft 12a. For selectively optically connecting the moving-side optical fiber 4 to either of the array-side optical fibers 2 in the above structure, the arraying-member rotating device 12 is first actuated to rotate the optical-fiber-arraying-member 1 to a desired position. Then the rotating device 11 is actuated to locate the moving-side optical fiber 4 in an optical fiber fixing groove 1a, so that the end of the moving-side optical fiber 4 is opposed to the end of an array-side optical fiber 2.

Since the optical switch 10 of the present embodiment is constructed in this structure in which the moving-side optical fiber 4 is optically connected to the array-side optical fiber 2 by rotating the moving-side optical fiber 4 and the optical-fiber-arraying-member 1 relative to each other about the center axis of the arc (virtual circle), the moving-side optical fiber 4 does not have to be moved in parallel in the array direction of the array-side optical fibers 2, different from the optical switch using the optical-fiber-arraying-member of the type in which a plurality of optical fiber fixing grooves are formed in parallel on a flat plate. Namely, use of the rotating mechanism obviates the need for use of the ball screw, linear guide, etc. necessary for the parallel movement and permits compactification, simplification, and cost reduction of the mechanism for selectively optically connecting the optical fibers.

In the present embodiment, the carrying device for optically connecting the moving-side optical fiber 4 to the array-side optical fiber 2 is only the above rotating device 11, but, in addition thereto, the carrying device may also be provided with a device for reciprocating the moving-side optical fiber 4 in directions in which the end of the moving-side optical fiber 4 moves toward and away from the end of the array-side optical fiber 2, i.e., in the extending directions of the optical fiber fixing groove 1a. The carrying device may also be equipped with only a device for vertically moving the moving-side optical fiber 4, instead of the device for rotating the moving-side optical fiber 4. In this case, the moving-side optical fiber 4 comes to-be opposed to the array-side optical fiber 2 when the moving-side optical fiber 4 is moved down.

In the present embodiment the optical-fiber-arraying-member 1 is rotated for selecting the array-side optical fiber 2 to be optically connected, but instead the moving-side optical fiber 4 may be arranged to rotate about the axis passing the center 1o of the optical-fiber-arraying-member 1. In another configuration, the selection operation may also be performed by rotating both the optical-fiber-arraying-member 1 and the moving-side optical fiber 4 about the axis passing the center 1o of the optical-fiber-arraying-member 1. In these configurations, the use of the rotating mechanism obviates the need for use of the ball screw, linear guide, etc. necessary for the parallel movement, which achieves the simplification and cost reduction of the carrying mechanism.

A matching solution may also be used on the occasion of optically connecting the moving-side optical fiber 4 to the array-side optical fiber 2. In another example, the whole of the optical-fiber-arraying-member 1 may be dipped in the matching solution.

Further, the central angle of the arc of the optical-fiber-arraying-member 1 is 180° in the present embodiment, but it does not have to be limited to this angle. The central angle may be larger or smaller than 180°.

Second Embodiment

Figure 2:
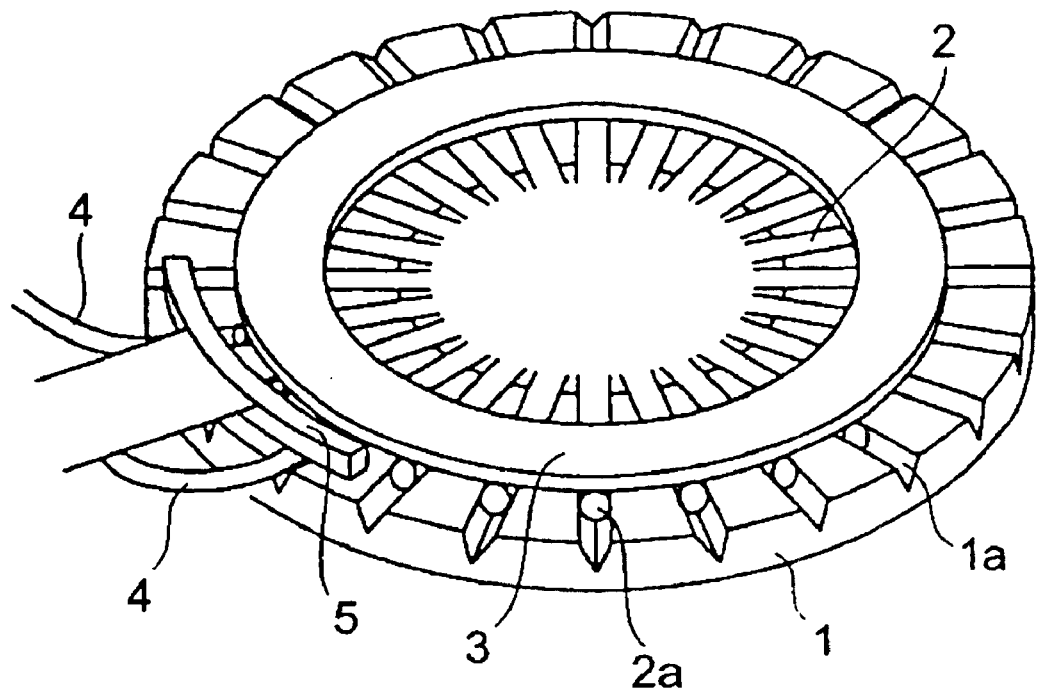
FIG. 2 is a diagram to show a second embodiment of the optical switch according to the present invention.

FIG. 2 is a diagram to show the second embodiment of the optical switch according to the present invention. In the present embodiment, the optical-fiber-arraying-member 1 is not of the semicircular shape, but of the ring shape with a hole in the center. There are two moving-side optical fibers 4 provided. The carrying mechanism of the moving-side optical fibers 4 and the rotating mechanism of the optical-fiber-arraying-member 1 are omitted from the illustration. The array-side optical fibers 2 are bundled above the optical-fiber-arraying-member 1 as in the first embodiment, though not illustrated. In the case where the optical-fiber-arraying-member 1 is the one having the hole in the central part, the array-side optical fibers 2 may be guided through the hole to below the optical-fiber-arraying-member 1.

A necessary number of moving-side optical fibers 4 are moved by the carrying device not illustrated, to be optically connected to the ends 2a of the array-side optical fibers 2 and thereafter the moving-side optical fibers 4 are pressed against the optical-fiber-arraying-member 1 by a holding member (press member) 5 in the present embodiment. The holding member 5 is supported by a supporting mechanism independent of the carrying device of the moving-side optical fibers 4, but it may also be attached to the carrying device. When the number of optical fibers pressed by the holding member 5 is large, that is, when the width of the press area is large, the shape of the holding member 5 is preferably an arcuate shape having its center at the center 1o of the optical-fiber-arraying-member 1. Further, the holding member 5 is preferably one for elastically pressing the moving-side optical fibers 5. The holding member 5 may be made of an elastic material, for example, phosphor bronze, or an elastic body, for example rubber or synthetic resin or the like, may also be attached to its press surface.

The optical switch of the present embodiment can also present the effect similar to that in the first embodiment. The present embodiment has the advantage that more array-side optical fibers 2 can be arrayed than in the first embodiment.

If the optical-fiber-arraying-member 1 is rotated over 360°, the bundle of array-side optical fibers 2 will be twisted undesirably. In order to prevent it, it is preferable to provide a mechanism for limiting angles of rotation of the rotational support shaft supporting the optical-fiber-arraying-member 1. A simple example is a method of providing a stopper.

Third Embodiment

Figure 3:
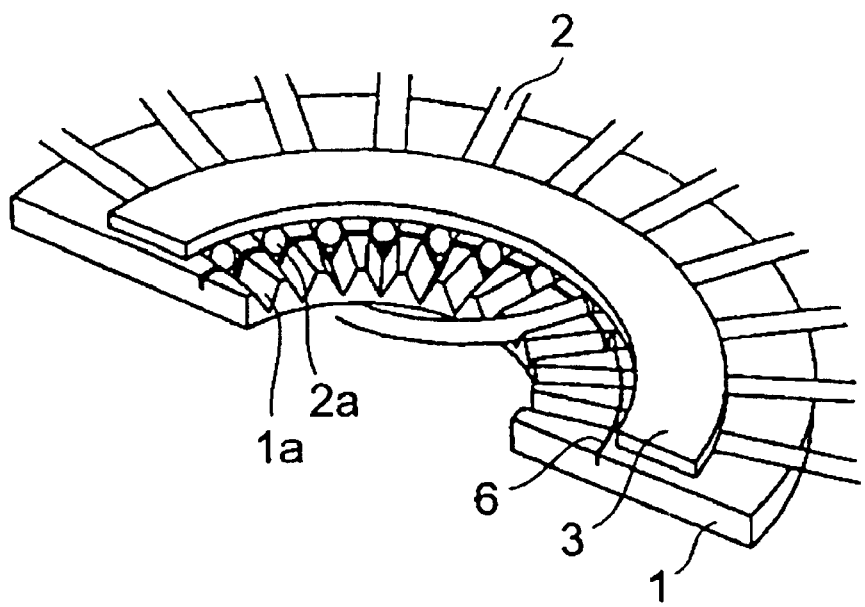
FIG. 3 is a diagram to show a third embodiment of the optical switch according to the present invention.

FIG. 3 is a diagram to show the third embodiment of the optical switch according to the present invention. The optical switch of the present embodiment is different from the optical switch of the second embodiment in that the shape of the optical-fiber-arraying-member 1 is arcuate and in that the array-side optical fibers 2 are arranged so that the end faces 2a thereof are directed to the inside, i.e., toward the center axis of the arc of the optical-fiber-arraying-member 1. In the first embodiment and the second-embodiment, the end faces 2a of the array-side optical fibers 2 are arranged to be directed toward the outside of the optical-fiber-arrayingmember 1. In this arrangement, the intervals of the optical fiber fixing grooves 1a for the moving-side optical fiber 4 to be set therein are large enough to facilitate setting of the moving-side optical fiber 4. It is, however, naturally possible to employ such arrangement that the optical fiber end faces 2a of the array-side optical fibers 2 are directed to the inside as in the present embodiment. Therefore, the first embodiment may also employ such arrangement that the end faces 2a of the array-side optical fibers 2 are directed to the inside.

The optical-fiber-arraying-member 1 of the present embodiment has a cut slit 6 formed during execution of cutting for cutting the ends 2a of the array-side optical fibers 2 to align them. This will be described below with reference to FIG. 4.

Figure 4:
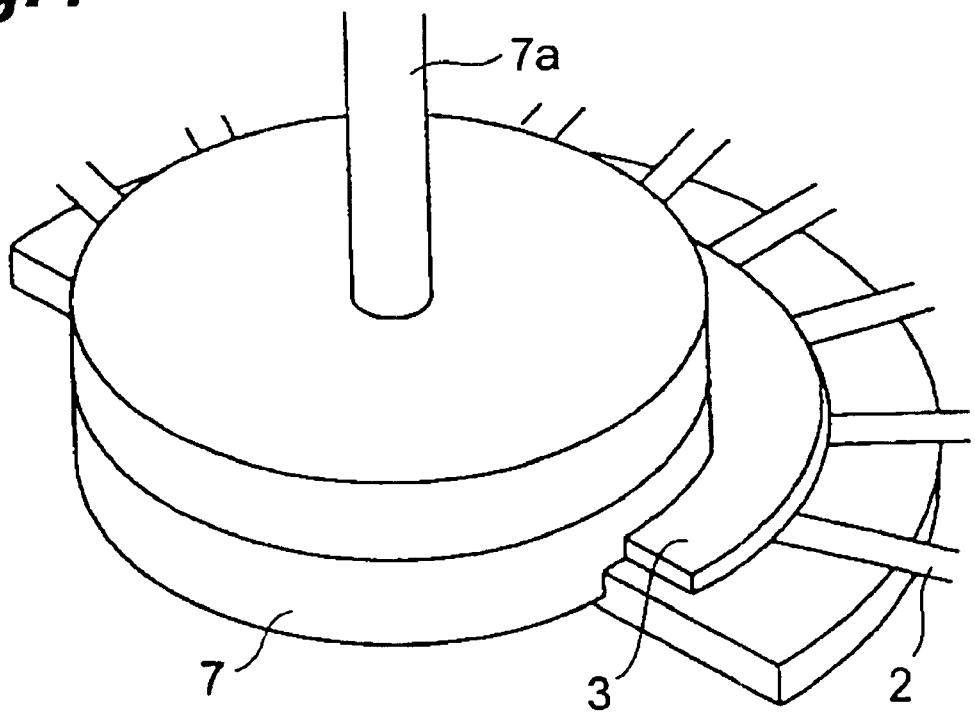
FIG. 4 is an explanatory diagram to illustrate a step of cutting the ends of respective array-side optical fibers after the array-side optical fibers have been arrayed and fixed on the optical-fiber-arraying-member.

FIG. 4 is an explanatory diagram to illustrate a step of cutting the ends of the respective array-side optical fibers 2 after the plurality of array-side optical fibers 2 have been arrayed in the optical fiber fixing grooves 1a of the optical-fiber-arraying-member 1 and fixed by the fixing member 3. In this case, a cutter (cylindrical edge) 7 is used for cutting the ends 2a of the array-side optical fibers 2 to align them. The cutter 7 is a tool having a cutting edge around the peripheral edge of a cylindrical shape like a lid of a tea caddy and is rotated by a rotation shaft 7a passing the center thereof. The rotation shaft 7a is aligned with the center point of the arc (virtual circle) of the optical-fiber-arraying-member 1, whereby the cutter 7 forms a cut trace along a circle concentric with the optical-fiber-arraying-member 1 and aligns the fiber end faces 2a of the array-side optical fibers 2 on the circumference. This improves the accuracy of the mount position of each array-side optical fiber 2 and permits the end faces to be polished together after the arraying, which obviates the need for the work of polishing the end faces before the arraying.

Fourth Embodiment

Figure 5:
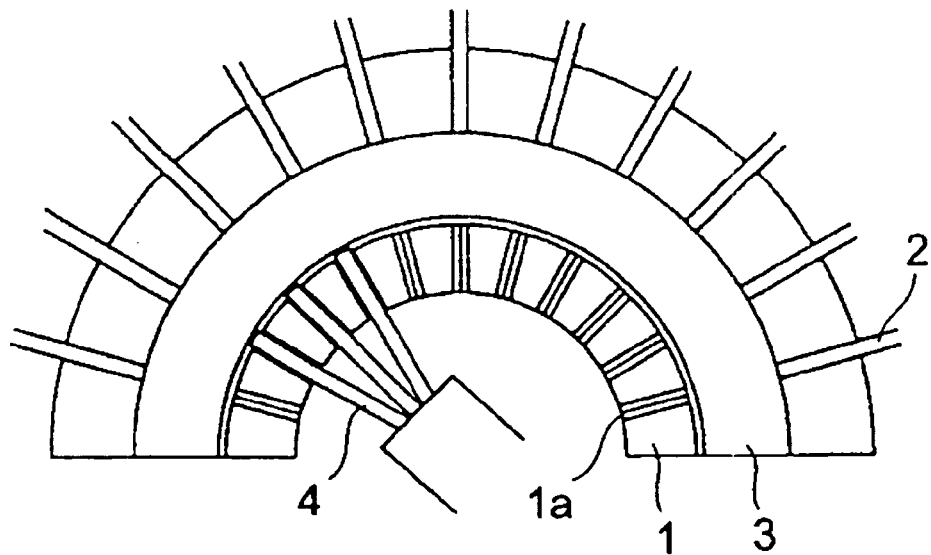
FIG. 5 is a diagram to show a fourth embodiment of the optical switch according to the present invention.

FIG. 5 is a diagram to show the fourth embodiment of the optical switch according to the present invention. In the present embodiment, there are three moving-side optical fibers 4 provided. In this setup, a plurality of moving-side optical fibers 4 can simultaneously be connected to the array-side optical fibers 2 corresponding thereto, and it thus becomes feasible to decrease the time of connection tests and circuit tests. The number of moving-side optical fibers 4 does not have to be limited to three, but may be four or more, of course.

Fifth Embodiment

Figure 6:
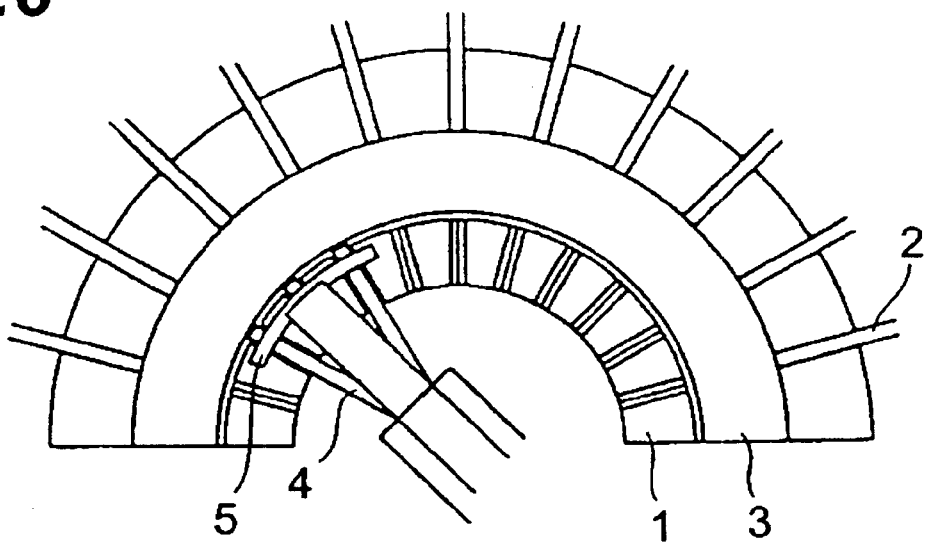
FIG. 6 is a diagram to show a fifth embodiment of the optical switch according to the present invention.

FIG. 6 is a diagram to show the fifth embodiment of the optical switch according to the present invention. In the present embodiment, there are also a plurality of moving-side optical fibers 4 provided, as in the fourth embodiment. The present embodiment is different from the fourth embodiment in that the moving-side optical fibers 4 are pressed against the optical-fiber-arraying-member 1 near their connection points by the holding member 5 in a state in which the moving-side optical fibers 4 are in optical contact with the array-side optical fibers 2. This can stabilize the connection state between the moving-side optical fibers 4 and the array-side optical fibers 2.

The holding member 5 is preferably of the arcuate shape concentric with the arc of the optical-fiber-arraying-member 1. In the present embodiment the plurality of moving-side optical fibers 4 are pressed together by the single holding member 5, but a plurality of holding members may be used to press each of the moving-side optical fibers 4 separately.

[Production Method of Optical-fiber-arraying-member]

Figure 7:
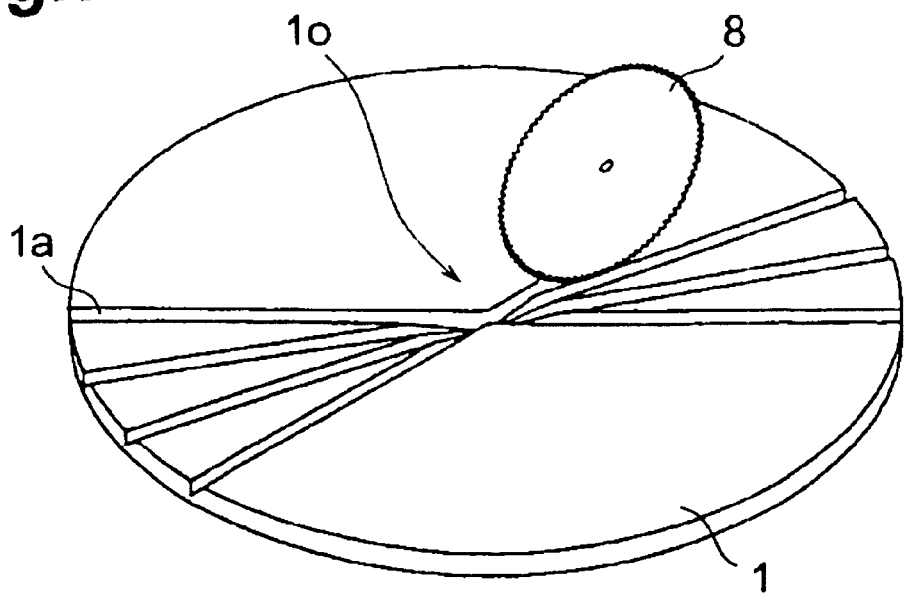
FIG. 7 is a diagram used for explaining a production method of the optical-fiber-arraying-members used in the first embodiment to the fifth embodiment.

FIG. 7 is a diagram to show a production method of the optical-fiber-arraying-members used in the first embodiment to the fifth embodiment. A cutter 8 is used in the method illustrated in FIG. 7. While supporting a base material of the optical-fiber-arraying-member 1, the cutter 8 is moved through the center 1o of the optical-fiber-arraying-member 1 to form an optical fiber fixing groove 1a of a V-shaped cross section. The cutter 8 is a rotary blade and the cross-sectional shape of its edge is one corresponding to the cross-sectional shape of the optical fiber fixing grooves 1a. The optical-fiber-arraying-member 1 is supported so as to be rotatable about the center 1o.

Then the optical-fiber-arraying-member 1 is rotated by a predetermined angle per formation of one optical fiber fixing groove 1a and then a new optical fiber fixing groove 1a is formed with the cutter 8. By repeating this, a plurality of optical fiber fixing grooves 1a extending along radial directions of a virtual circle can be formed on the base material of the optical-fiber-arraying-member 1. During this operation the optical-fiber-arraying-member 1 is rotated by the fixed angle every time, whereby angular intervals of the optical fiber fixing grooves 1a thus formed become constant. The angular intervals of the optical fiber fixing grooves 1a do not necessarily have to be constant, if so desired. The moving direction of the cutter 8 may be rotated instead of rotating the optical-fiber-arraying-member 1, or the both may be rotated.

Figure 8:
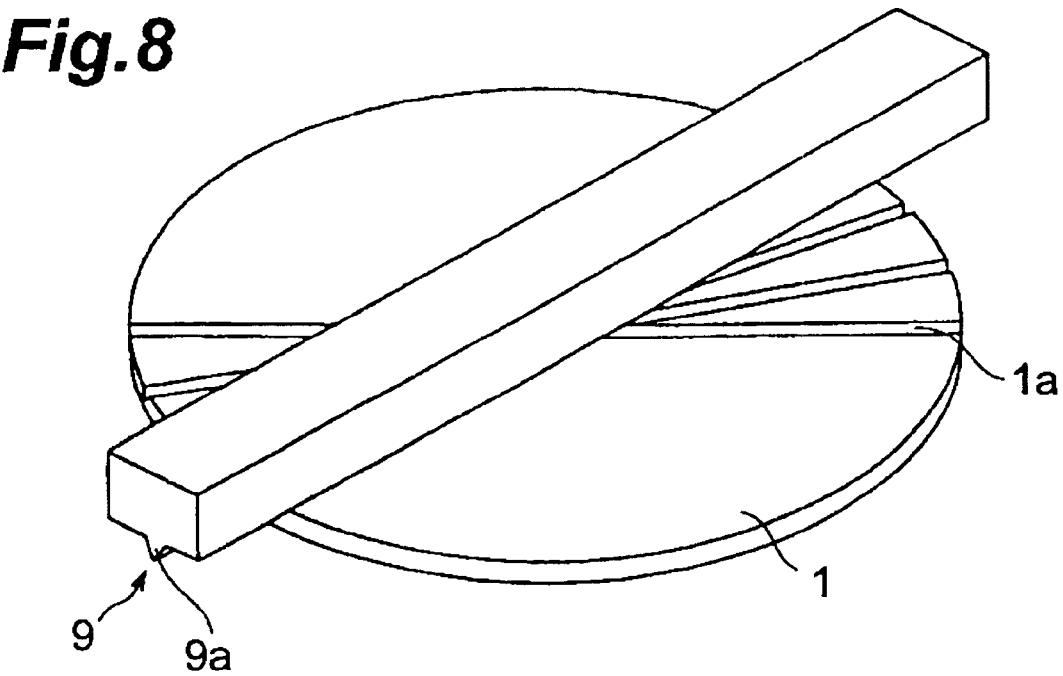
FIG. 8 is a diagram used for explaining another production method of the optical-fiber-arraying-members used in the first embodiment to the fifth embodiment.

FIG. 8 is a diagram to show another production method of the optical-fiber-arraying-members used in the first embodiment to the fifth embodiment. A stamp member (template) 9 is used in the method illustrated in FIG. 8. The stamp member 9 is provided with a groove-forming rib 9a for forming the optical fiber fixing groove 1a in the optical-fiber-arraying-member 1. Since this production method is a method of pressing the stamp member 9 against the base material of the optical-fiber-arraying-member 1 to form the optical fiber fixing groove 1a by plastic deformation of the optical-fiber-arraying-member 1, a material that can be brought into a plastically deformable state is used as the base material of the optical-fiber-arraying-member 1. For example, when the base material is glass, the base material is heated up to near its softening point and then the stamp member 9 is pressed against it while keeping the temperature constant. The cross-sectional shape of the rib 9a pressed against the base material is set to the shape corresponding to the cross-sectional shape (V-shape) of the optical fiber fixing grooves 1a. The material of the stamp member 9 is a hard material such as steel or the like. For example, in the case where the base material of the optical-fiber-arraying-member 1 is synthetic resin, the stamp member 9, after heated, may be pressed against the base material.

For forming the optical fiber fixing grooves 1a by pressing the stamp member 9, the stamp member 9 and the base material of the optical-fiber-arraying-member 1 are positioned so as to pass the center 1o of the optical-fiber-arraying-member 1. Then the stamp member 9 is pressed against the optical-fiber-arraying-member 1 every rotation of either the stamp member 9 or the base material of the optical-fiber-arraying-member 1, or the both, whereby a plurality of optical fiber fixing grooves 1a extending along the radial directions of the virtual circle can be radially formed.

In the production methods described referring to FIG. 7 and FIG. 8, the object was the circular optical-fiber-arraying-member 1, but it may also be arcuate. The outer periphery, and the inner periphery if necessary, may be ground either before or after the formation of the optical fiber fixing grooves 1a.

In each of the above embodiments there is only one optical-fiber-arraying-member 1 provided, but a plurality of optical-fiber-arraying-members 1 may also be arranged in multi-stage structure.

Further, the shape of the optical-fiber-arraying-member 1 is by no means limited to the circular shape or the arcuate shape (sectorial shape) described above. It can be a polygonal shape such as a rectangular shape or the like, or a shape surrounded by an appropriate curve. The point is that the plurality of optical fiber fixing grooves 1a are radially formed. The first to the fifth embodiments are characterized in that the optical fiber fixing grooves 1a are formed along the radial directions of the predetermined circle, but there will exist neither a circle nor an arc if the shape of the optical-fiber-arraying-member 1 is not circular or arcuate. For this reason, a virtual circle is hypothetically considered if necessary, and the optical fiber fixing grooves are formed along radial directions of that circle. In the above description, the circle hypothetically considered in this way is called a "virtual circle."

Sixth Embodiment

Figure 9:
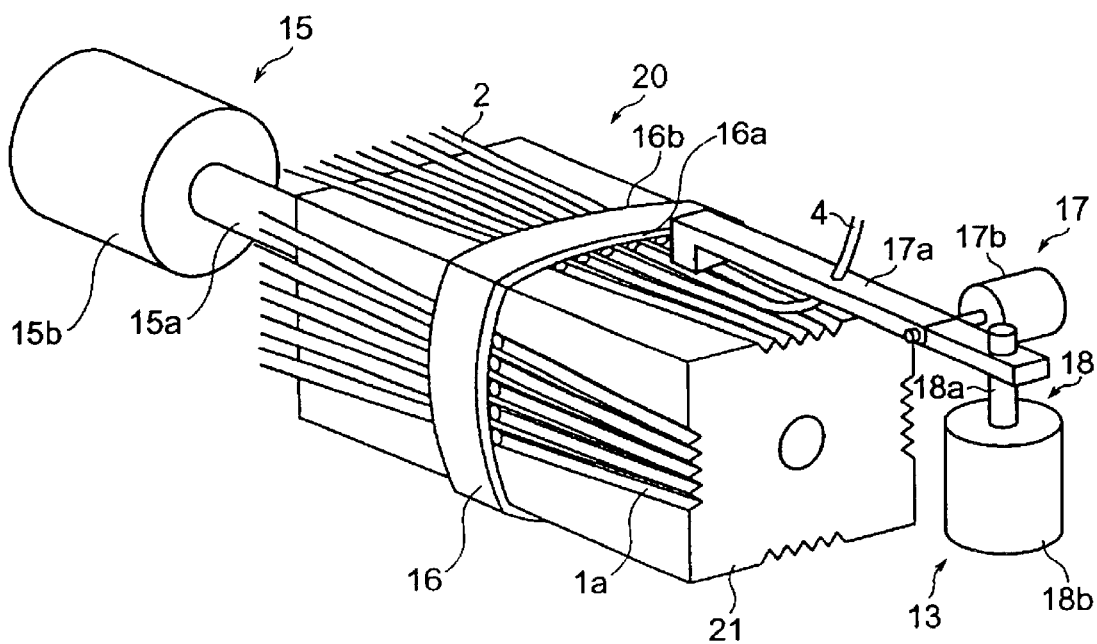
FIG. 9 is a diagram to show a sixth embodiment of the optical switch according to the present invention.

FIG. 9 is a diagram to show the sixth embodiment of the optical switch according to the present invention. The optical switch 20 of the present embodiment is mainly comprised of the optical-fiber-arraying-member 21 of a prismatic shape in which the optical fiber fixing grooves 1a are radially formed in each of its side faces, the plurality of array-side optical fibers 2 arrayed in the respective optical fiber fixing grooves 1a, the fixing member 16 for pressing the array-side optical fibers 2 against the optical-fiber-arraying-member 21 to fix them, the moving-side optical fiber 4 to be optically connected to either of the plurality of array-side optical fibers 2, the fiber rotating device 13 for rotating the moving-side optical fiber 4, and the arraying-member rotating device 15 for rotating the optical-fiber-arraying-member 1 about the center axis of the prism.

The optical-fiber-arraying-member 21 is made of a material that permits the formation of the optical fiber fixing grooves 1a, such as synthetic resin, glass, silicon, etc., as in the first embodiment to the fifth embodiment, and is formed in the prismatic shape as described above. The cross section of the prism is desirably a regular polygon and is a square in the present embodiment. The cross-sectional shape of the optical fiber fixing grooves 1a is the V-shape and the axes of the grooves are arranged to intersect at one point outside the optical-fiber-arraying-member 21. Namely, each optical fiber fixing groove 1a extends along a radial direction of a virtual circle. It can be said that the virtual circle is present on the same plane as the surface of the optical-fiber-arraying-member 21 if the difference of height is ignored between the center lines of the optical fibers placed in the optical fiber fixing grooves 1a and the surface of the optical-fiber-arraying-member 21. It is, however, noted that the center of the virtual circle is located outside the optical-fiber-arraying-member 21 in the present embodiment.

The array-side optical fibers 2 are arrayed so that their end faces 2a are directed toward the center of the virtual circle, and they are fastened to the optical-fiber-arraying-member 21 by the aforementioned fixing member 16 of ring shape near their ends, to be positioned and fixed thereby. Since the fixing member 16 holds the vicinity of the end faces 2a of the array-side optical fibers 2 on each side face, the front edge 16a thereof is arcuate on each of the side faces. Although the rear edge 16b may be linear, it is arcuate in the present embodiment. In FIG. 9 the array-side optical fibers 2 are illustrated only in part, but they are bundled behind the optical-fiber-arraying-member 21.

The fiber rotating device 13 for rotating the moving-side optical fiber 4 is provided with a first 6 rotating mechanism (carrying device) 17 for rotating the moving-side optical fiber 4 to bring it toward and away from the optical-fiber-arraying-member 21 like the rotating device 11 of the first embodiment, and a second rotating mechanism 18 for rotating the moving-side optical fiber 4 about the center axis of the virtual circle.

The first rotating mechanism 17 includes a support member 17a functioning to support the moving-side optical fiber 4 and to press it against the optical-fiber-arraying-member 21, and a motor 17b for rotating the support member 17a. The second rotating mechanism 18 includes a rotation shaft 18a supporting the support member 17a and located on the center axis of the virtual circle and a motor 18b for rotating the rotation shaft 18a.

Further, the arraying-member rotating device 15 for rotating the optical-fiber-arraying-member 21 includes a support shaft 15a connected to the optical-fiber-arraying-member 21 and located on the center axis of the prism and a motor 15b for rotating the support shaft 15a.

For selectively optically connecting the moving-side optical fiber 4 to either of the array-side optical fibers 2 in the above structure, the arraying-member rotating device 15 is first actuated to rotate the optical-fiber-arraying-member 21 to a desired position and select a side face on which the array-side optical fiber 2 to be connected is placed. Then the second rotating mechanism 18 is actuated to rotate the moving-side optical fiber 4 about the center axis of the virtual circle and select the array-side optical fiber 2 to be optically connected. After the selection of the array-side optical fiber 2, the first rotating mechanism 17 is actuated to locate the moving-side optical fiber 4 in the corresponding fiber fixing groove 1a, so that the end of the moving-side optical fiber 4 is opposed to the end of the array-side optical fiber 2.

With the optical switch 20 of the present embodiment, as described above, the side face of the prism on which the array-side optical fiber 2 to be optically connected is placed can be selected by simply rotating the optical-fiber-arraying-member 21 and the moving-side optical fiber 4 relative to each other around the prism. Since the moving-side optical fiber 4 is optically connected to the array-side optical fiber 2 by rotating the moving-side optical fiber 4 and the optical-fiber-arraying-member 21 relative to each other about the center axis of the virtual circle as in the case of the first embodiment to the fifth embodiment, the moving-side optical fiber 4 does not have to be moved in parallel in the array direction of the array-side optical fibers 2, different from the optical switch using the optical-fiber-arraying-member of the type in which a plurality of optical fiber fixing grooves are formed in parallel on a flat plate. Namely, the use of the rotating mechanism obviates the need for use of the ball screw, linear guide, etc. necessary for the parallel movement and this can implement the compactification, simplification, and cost reduction of the mechanism for selectively optically connecting the optical fibers. Further, since the optical fiber fixing grooves 1a are formed in the plurality of side faces of the prism in the present embodiment, a lot of array-side optical fibers 2 can be arrayed on the optical-fiber-arraying-member 21. In order to achieve such effect, the optical fiber fixing grooves 1a do not always have to be formed in all the side faces of the optical-fiber-arraying-member 21, but may be formed in two or more side faces.

In the present embodiment the carrying device for optically connecting the moving-side optical fiber 4 to the array-side optical fiber 2 selected by the arraying-member rotating device 15 is only the above first fiber rotating device 13, but, in addition thereto, the carrying device may also incorporate a device for reciprocating the moving-side optical fiber 4 in the directions in which the end face of the moving-side optical fiber 4 is moved toward and away from the end face 2a of the array-side optical fiber 2, i.e., in the extending directions of the optical fiber fixing groove 1a. The carrying device may also include a device for vertically moving the moving-side optical fiber 4, instead of the first rotating mechanism 17 for rotating the moving-side optical fiber 4. In this case, when the moving-side optical fiber 4 is moved down, the moving-side optical fiber 4 comes to be opposed to the array-side optical fiber 2.

Instead of rotating the moving-side optical fiber 4 about the center axis of the virtual circle, the optical-fiber-arraying-member 21 may be rotated about the center axis of the virtual circle. In this case, only the function necessary for the fiber rotating device 13 is the one for bringing the moving-side optical fiber 4 into contact with the end face 2a of the array-side optical fiber 2 selected, and thus the second rotating mechanism 18 described above can be omitted.

If the optical-fiber-arraying-member 21 is rotated over 360° by the arraying-member rotating device 15, the bundle of the array-side optical fibers 2 will be twisted undesirably. In order to prevent it, it is preferable to provide a mechanism for limiting angles of rotation of the support shaft 15a of the arraying-member rotating device 15. A simple example is a method of providing a stopper.

In the present embodiment the optical-fiber-arraying-member 21 is rotated by the rotation shaft (support shaft 15a) passing the center axis of the prism, but the carrying device may also be constructed in such structure that the moving-side optical fiber 4 is supported so as to be rotatable about the center axis of the optical-fiber-arraying-member 21 and that the selection operation of the side face is carried out by rotating the moving-side optical fiber 4. In another configuration, the selection operation is implemented by rotating both the optical-fiber-arraying-member 21 and the moving-side optical fiber 4 about the center axis of the optical-fiber-arraying-member 21. In these configurations, the use of the rotating mechanism also obviates the need for use of the ball screw, linear guide, etc. necessary for the parallel movement and thus realizes the simplification and cost reduction of the carrying mechanism.

Seventh Embodiment

Figure 10:
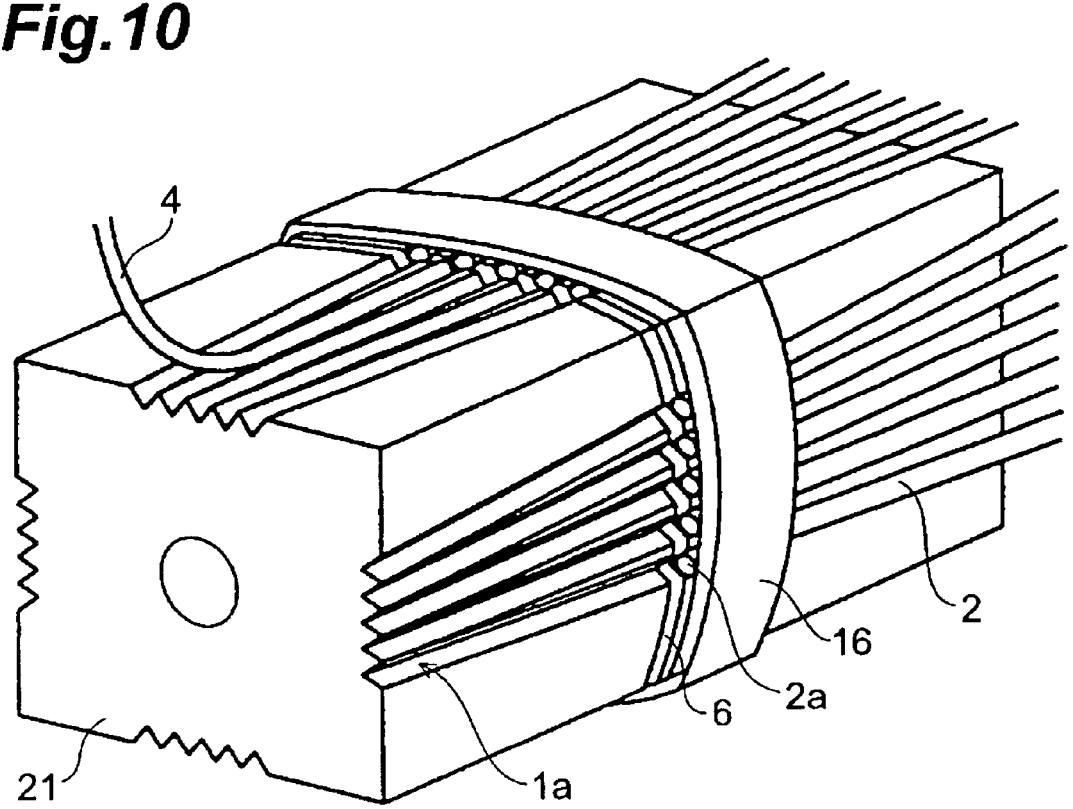
FIG. 10 is a diagram to show a seventh embodiment of the optical switch according to the present invention.

FIG. 10 is a diagram to show the seventh embodiment of the optical switch according to the present invention. The present embodiment is different from the sixth embodiment in that the optical-fiber-arraying-member 21 has the cut slit 6 formed on the occasion of cutting for aligning the ends 2a of the array-side optical fibers 2. The fiber rotating device 13 and the arraying-member rotating device 15 are omitted from the illustration.

Figure 11:
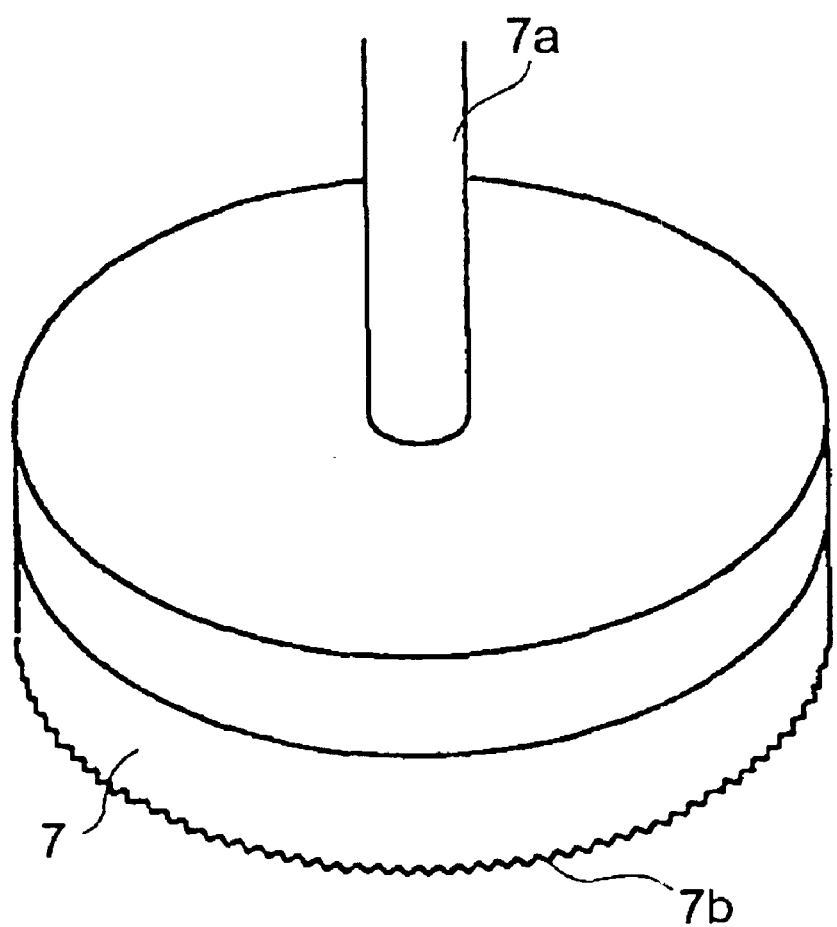
FIG. 11 is a perspective view of a rotary cutter used for cutting the ends of array-side optical fibers to align them in the seventh embodiment.

FIG. 11 is a diagram to show the cutter (cylindrical edge) 7 used for aligning the ends 2a of the array-side optical fibers 2. The cutter 7 is a tool having an edge part 7b around the peripheral edge of a cylindrical shape like a lid of a tea caddy, which is rotated by the rotation shaft 7a passing the center thereof. For cutting the ends 2a of the respective array-side optical fibers 2 to align them by the cutter. 7 of this type, a plurality of array-side optical fibers 2 are first arrayed in the optical fiber fixing grooves 1a of the optical-fiber-arraying-member 21 and fixed by the fixing member 16. After that, the rotation shaft 7a of the cutter 7 is aligned with the center axis of the virtual circle. The radius of the edge 7b is equal to a length from the center of the virtual circle to the position where the ends 2a of the array-side optical fibers 2 are to be cut. Next, the cutter 7 is rotated to cut the array-side optical fibers 2 arrayed on the optical-fiber-arraying-member 21. At this time, the edge part 7b of the cutter 7 makes a cut trace of a circular shape eccentric with the virtual circle, whereby the ends 2a of the array-side optical fibers 2 can be aligned on a predetermined circumference.

After completion of the cutting work of one side face, the optical-fiber-arraying-member 21 is rotated about the center axis of the prism to oppose the next side face to the cutter 7. Then the like cutting work is carried out to align the ends of the array-side optical fibers 2 arrayed on the necessary side face. The cutter 7, instead of the optical-fiber-arraying-member 21, may be rotated about the center axis of the optical-fiber-arraying-member 21, so as to be opposed to a side face to be subjected to the cutting work.

In the present embodiment the cutter 7 permits improvement in the accuracy of mount position of each array-side optical fiber 2 and also permits polishing of end faces together after the arraying. This eliminates the need for polishing of end faces before the arraying.

Eighth Embodiment

Figure 12:
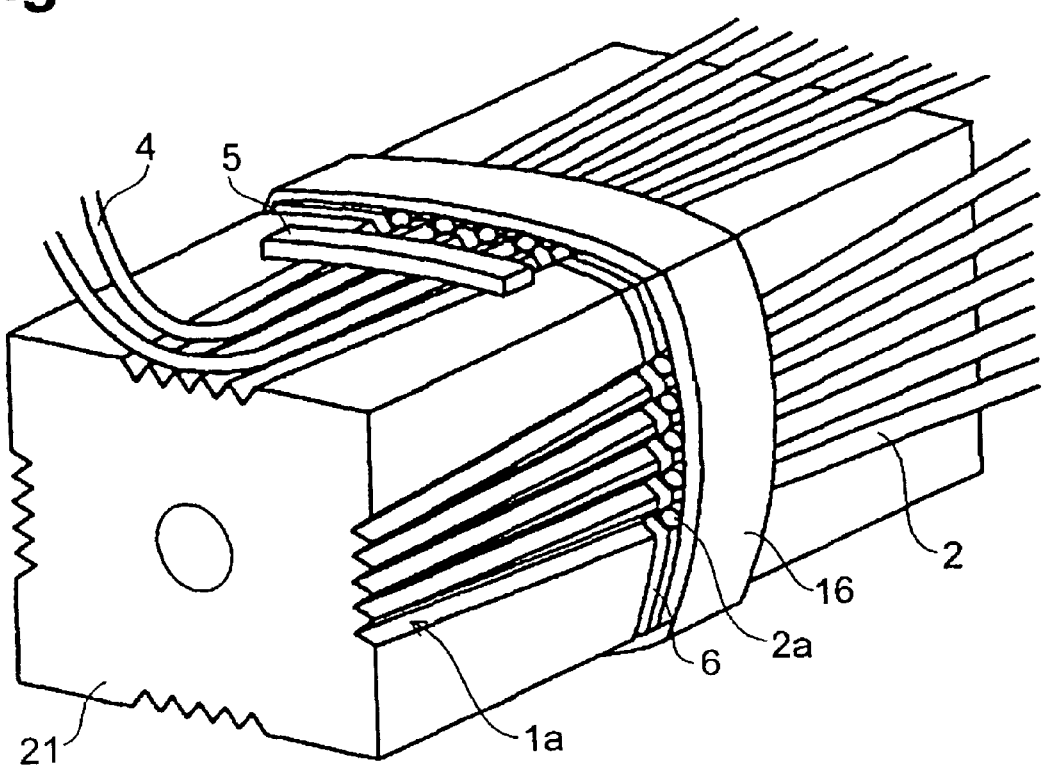
FIG. 12 is a diagram to show an eighth embodiment of the optical switch according to the present invention.

FIG. 12 is a diagram to show the eighth embodiment of the optical switch according to the present invention. In the present embodiment, there are a plurality of moving-side optical fibers 4 provided and each moving-side optical fiber 4 is positioned and fixed in a corresponding fiber fixing groove 1a by the holding member 5. The fiber rotating device 13 and the arraying-member rotating device 15 are omitted from the illustration.

The holding member 5 is supported by a support mechanism independent of the fiber rotating device 13 in the present embodiment, but may be coupled to the fiber rotating device 13. The connection state between fibers can be stabilized by holding the fibers at the position near the connection points in the contact state of each moving-side optical fiber 4 with the array-side optical fiber 2. In the case where the number of moving-side optical fibers 4 pressed by the holding member 5 is large, i.e., where the width of the press area is large, the shape of the press surface of the holding member 5 is preferably the arcuate shape having the center at the center of the virtual circle. The holding member 5 is preferably one for elastically pressing the moving-side optical fibers, as in the fifth embodiment.

The moving-side optical fibers 4 may be located in adjacent optical fiber fixing grooves 1a or in separated optical fiber fixing grooves 1a as illustrated. Either of these can be properly selected depending upon the purpose of use. For using a plurality of moving-side optical fibers 4, the plurality of moving-side optical fibers 4 may be integrally attached to one support member to compose an optical fiber head. Since this structure permits the plurality of moving-side optical fibers 4 to be simultaneously connected to the plurality of array-side optical fibers 2, it can decrease the time of connection tests and circuit tests.

Ninth Embodiment

Figure 13:
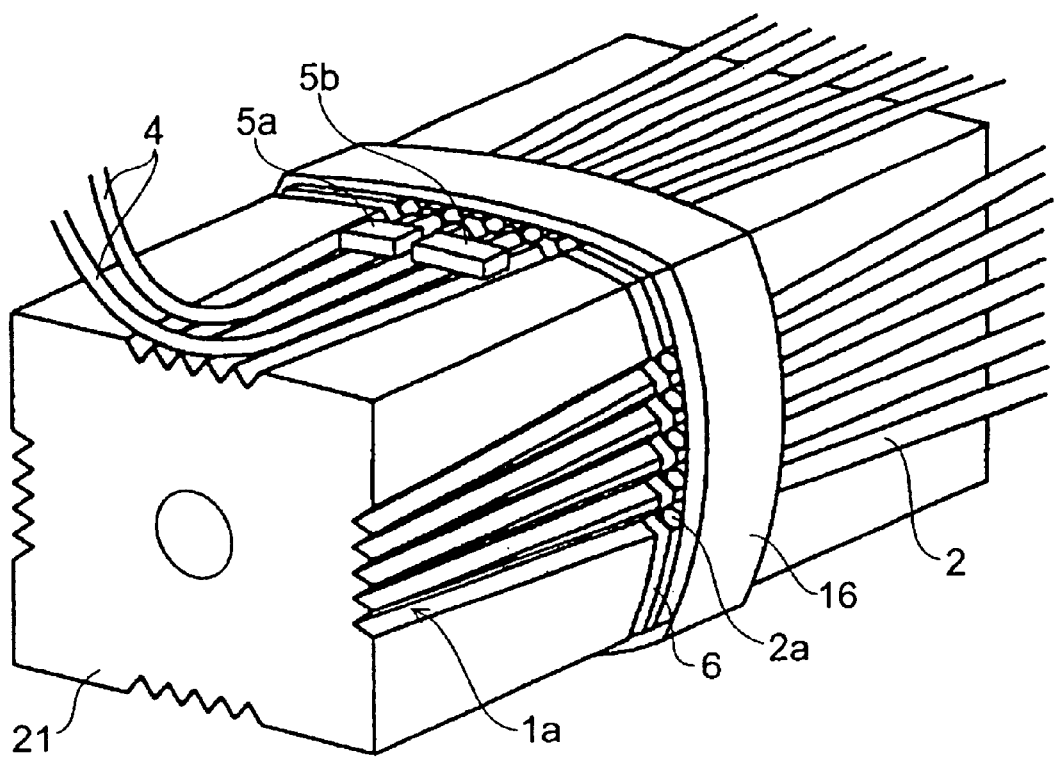
FIG. 13 is a diagram to show a ninth embodiment of the optical switch according to the present invention.

FIG. 13 is a diagram to show the ninth embodiment of the optical switch according to the present invention. In the present embodiment, the moving-side optical fibers 4 are positioned and fixed on the optical-fiber-arraying-member 21 by two holding members 5a, 5b. This setup is advantageous in connecting the moving-side optical fibers 4 separately to the array-side optical fibers 2.

[Production Method of Optical-fiber-arraying-member]

Figure 14:
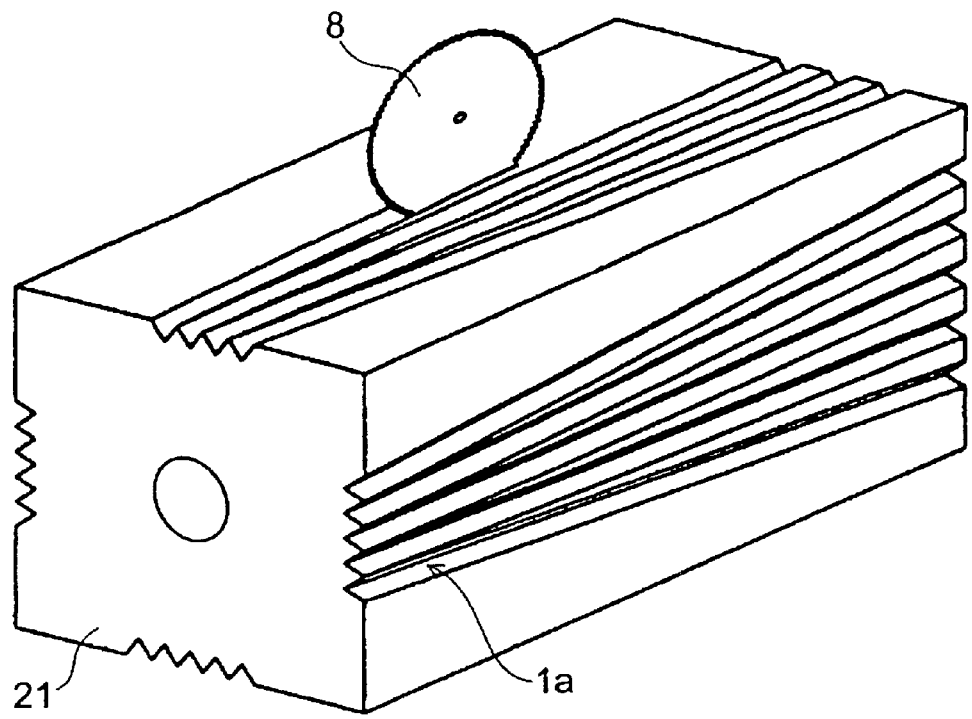
FIG. 14 is a diagram to show a production method of the optical-fiber-arraying-members used in the sixth embodiment to the ninth embodiment.

FIG. 14 is a diagram to show a production method of the optical-fiber-arraying-members used in the sixth embodiment to the ninth embodiment. The cutter 8 is used in the method illustrated in FIG. 14. On one side face of the optical-fiber-arraying-member 21, the cutter 8 is linearly moved along a radial direction of the virtual circle to form an optical fiber fixing groove 1a of the V-shape. The cutter 8 is a rotary blade and the cross-sectional shape of the edge corresponds to the cross-sectional shape of the optical fiber fixing grooves 1a. After formation of one optical fiber fixing groove 1a, the moving direction of the cutter 8 is rotated about the center axis of the virtual circle by an unrepresented mechanism and the optical-fiber-arraying-member 21 is further cut. Repeating this, a plurality of optical fiber fixing grooves 1a are radially formed in the above-stated one side face.

The cutter 8 is rotated by a fixed angle on the occasion of the rotation thereof about the center axis of the virtual circle, whereby the optical fiber fixing grooves 1a are formed at constant angular intervals. The angular intervals of the optical fiber fixing grooves 1a do not always have to be constant, if so desired. Further, instead of rotating the moving direction of the cutter 8 about the center axis of the virtual circle, the optical-fiber-arraying-member 21 may be rotated about the center axis of the virtual circle, or the both may be rotated.

After formation of the optical fiber fixing grooves 1a in the one side face, the unrepresented arraying-member rotating device is then actuated to rotate the optical-fiber-arraying-member 21 about the center axis of the prism and select another side face of the optical-fiber-arraying-member 21. After the optical fiber fixing grooves 1a are formed in the side face selected, still another side face is selected. Since the optical-fiber-arraying-member 21 is the prism of the square section in the present embodiment, the optical-fiber-arraying-member 21 is rotated by the angle of 90° in selecting each side face. If the cross-sectional shape of the optical-fiber-arraying-member 21 is a regular polygon with n sides, the angle of rotation of the optical-fiber-arraying-member 21 for selecting each side face is 360°/n. For selecting a side face for formation of the optical fiber fixing grooves 1a, the supporting mechanism of the cutter 8 may be rotated about the center axis of the optical-fiber-arraying-member 21, instead of rotating the optical-fiber-arraying-member 21. Further, the optical-fiber-arraying-member 21 and the support mechanism of the cutter 8 both may be rotated relative to each other. By repeating this, the desired optical fiber fixing grooves 1a can be formed in desired side faces.

Figure 15:
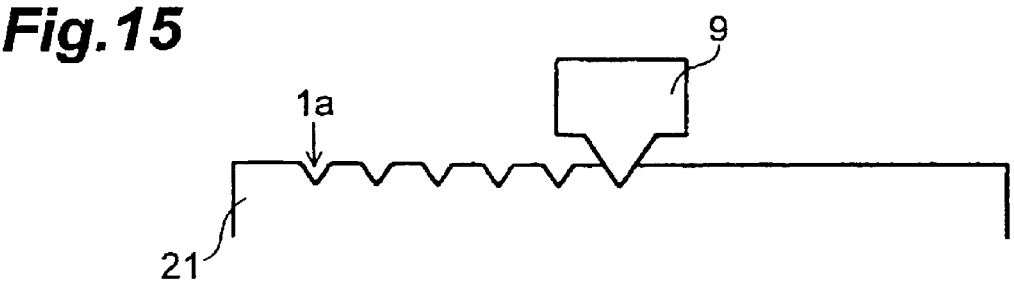
FIG. 15 is a diagram to show another production method of the optical-fiber-arraying-members used in the sixth embodiment to the ninth embodiment.

FIG. 15 is a diagram to show another production method of the optical-fiber-arraying-members used in the sixth embodiment to the ninth embodiment. The stamp member (template) 9 is used in the method illustrated in FIG. 15. The stamp member 9 is provided with the groove-forming rib 9a for forming the optical fiber fixing groove 1a in the optical-fiber-arraying-member 21. Since this production method is a method of pressing the stamp member 9 against the base material of the optical-fiber-arraying-member 21 to form the optical fiber fixing groove 1a by plastic deformation of the optical-fiber-arraying-member 21, a material that can be brought into a plastically deformable state is used as the base material of the optical-fiber-arraying-member 21. The cross-sectional shape of the rib 9a pressed against the base material is set to the shape corresponding to the cross-sectional shape (V-shape) of the optical fiber fixing grooves 1a.

For forming an optical fiber fixing groove 1a by pressing the stamp member 9, the first step is to select one side face in which the optical fiber fixing groove 1a of the optical-fiber-arraying-member 21 is to be formed. Then the rib 9a of the stamp member 9 is pressed against the optical-fiber-arraying-member 21 along a radial direction of the virtual circle to form the optical fiber fixing groove 1a of the V-shaped cross section.

After formation of one optical fiber fixing groove 1a, the optical-fiber-arraying-member 21 is rotated by the predetermined angle about the center axis of the virtual circle and the next optical fiber fixing groove 1a is formed by the stamp member 9. By repeating this, a plurality of optical fiber fixing grooves 1a are radially formed in one side face. The optical fiber fixing grooves 1a are formed at constant central angle intervals by rotating the optical-fiber-arraying-member 21 by the constant angle per rotation about the center axis of the virtual circle. The angular-intervals of the optical fiber fixing grooves 1a do not always have to be constant, if so desired. Further, instead of rotating the optical-fiber-arraying-member 21, the stamp member 9 may be rotated about the center axis of the virtual circle, or the both may be rotated.

After completion of the formation of the plurality of optical fiber fixing grooves 1a in one side face, the optical-fiber-arraying-member 21 is rotated about the center axis of the prism to select a next side face, and the optical fiber fixing grooves 1a are formed therein in similar fashion. By repeating this, the desired optical fiber fixing grooves 1a can be formed in desired side faces. Where the cross-sectional shape of the optical-fiber-arraying-member 21 is the regular polygon with n sides, the angle of rotation is 360°/n. Instead of rotating the optical-fiber-arraying-member 21, the support mechanism of the stamp member 9 may be rotated about the center axis of the optical-fiber-arraying-member 21 to select a side face in which the optical fiber fixing grooves 1a are to be formed. Further, the optical-fiber-arraying-member 21 and the support mechanism of the stamp member 9 both may be rotated.

Tenth-Embodiment

Figure 16:
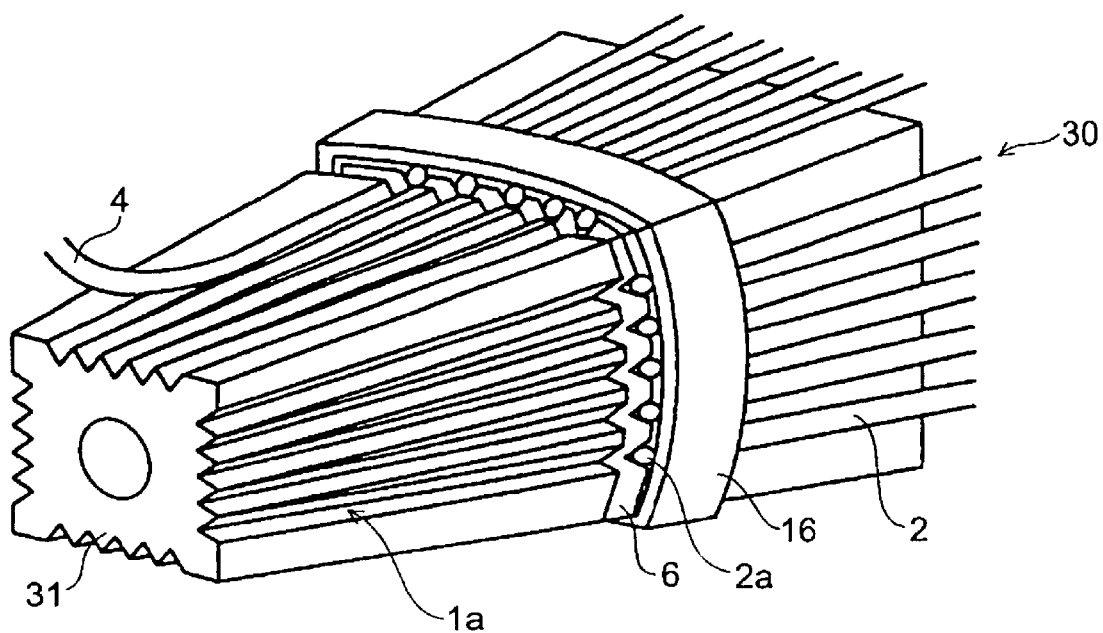
FIG. 16 is a diagram to show a tenth embodiment of the optical switch according to the present invention.

FIG. 16 is a diagram to show the tenth embodiment of the optical switch according to the present invention. The optical switch 30 of the present embodiment is different from the optical switches of the sixth embodiment to the ninth embodiment in that the optical-fiber-arraying-member used herein is the one 31 of a pyramid shape. The optical switch 30 of the present embodiment can also present the effect similar to that of the sixth embodiment. The pyramid is desirably a regular polygon pyramid. The optical fiber fixing grooves 1a are radially formed along radial directions of a virtual circle in each side face of the pyramid. Further, the array-side optical fibers 2 arrayed in the respective optical fiber fixing grooves are placed so that the end faces 2a thereof are directed toward the vertex of the pyramid.

The present embodiment can be regarded as one obtained by obliquely cutting the both side edges of each side face of the optical-fiber-arraying-member 21 of the prismatic shape described in the sixth embodiment to the ninth embodiment so as to form a frustum of pyramid. Therefore, the present embodiment accepts application of the production methods of the optical-fiber-arraying-member with the cutter and with the stamp member, the method of cutting the ends of the respective array-side optical fibers to align them by the cylindrical edge (the arraying method of optical fibers), etc. as the sixth embodiment to the ninth embodiment did. It is also a matter of course that the present embodiment can employ the configurations concerning the optical connection with the fiber rotating device 13, the arraying-member rotating device 15, etc. illustrated in FIG. 9, and the optical connection method. Since the frustum of pyramid is just one obtained by truncating a pyramid, the pyramid stated in the present invention is used as a term including the frustum of pyramid.

Eleventh Embodiment

Figure 17:
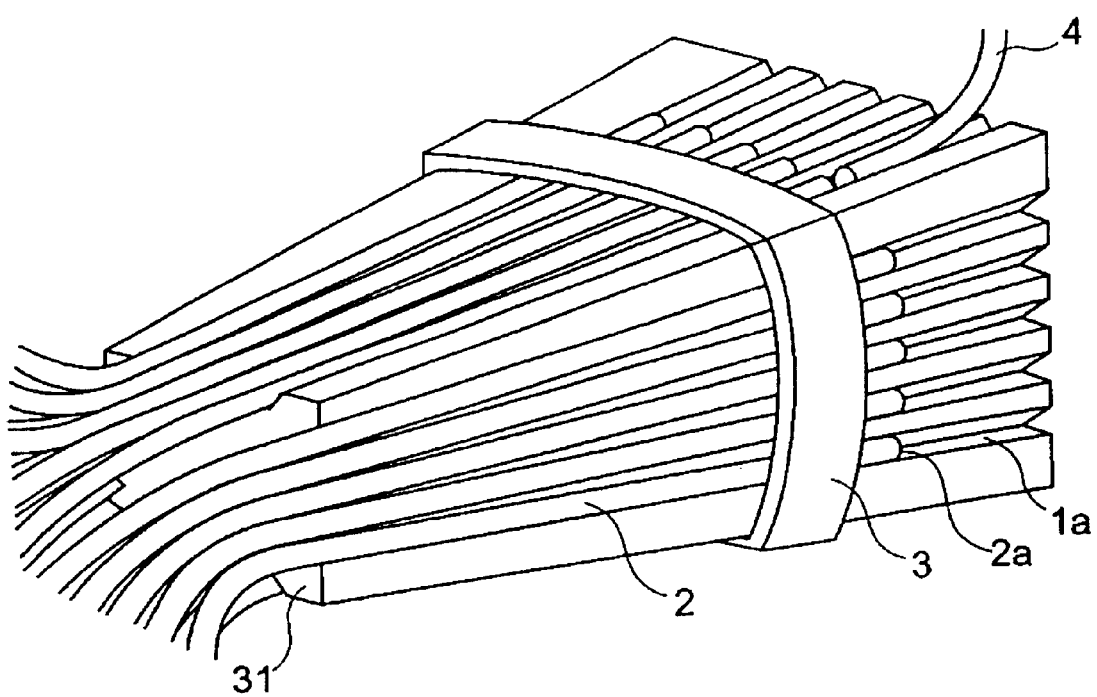
FIG. 17 is a diagram to show an eleventh embodiment of the optical switch according to the present invention.

FIG. 17 is a diagram to show the eleventh embodiment of the optical switch according to the present invention. The optical switch of the present embodiment is different in the array directions of the array-side optical fibers 2 from the optical switch of the tenth embodiment. In the present embodiment the array-side optical fibers 2 are arrayed so that the end faces 2a thereof are directed in the directions opposite to those toward the vertex of the pyramid. This structure can also present the effect similar to that in the sixth embodiment and in the tenth embodiment.

Twelfth Embodiment

Figure 18:
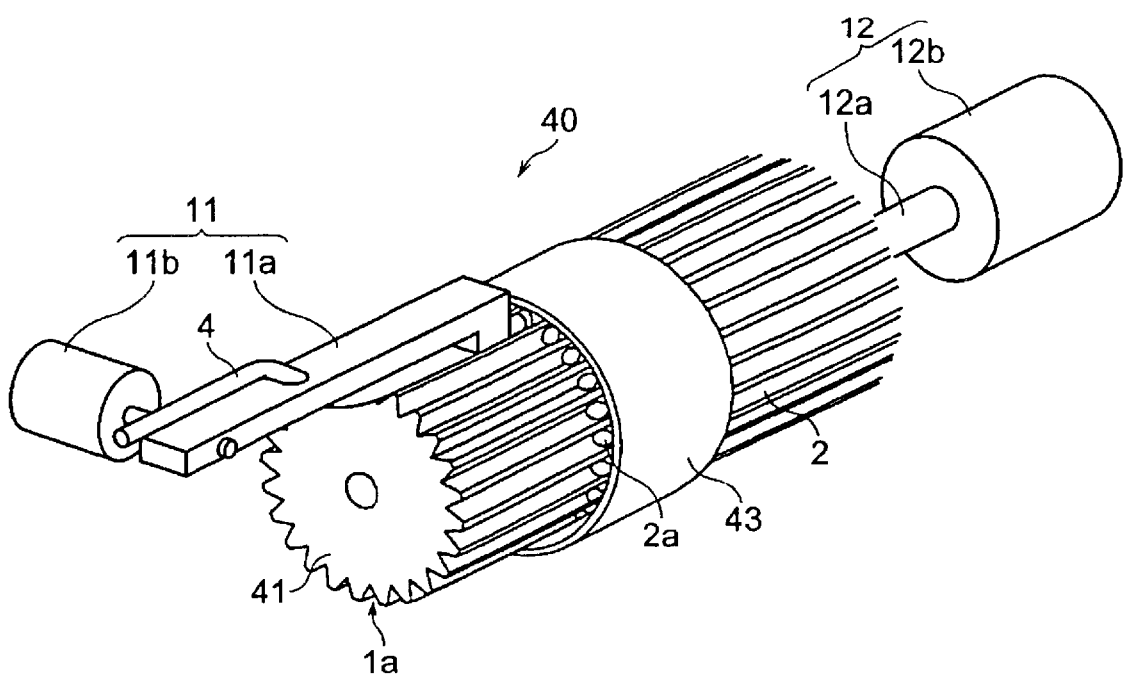
FIG. 18 is a diagram to show a twelfth embodiment of the optical switch according to the present invention.

FIG. 18 is a diagram to show the twelfth embodiment of the optical switch according to the present invention. The optical switch 40 of the present embodiment is mainly comprised of the optical-fiber-arraying-member 41 of the cylindrical shape in which the optical fiber fixing grooves 1a are formed, the plurality of array-side optical fibers 2 arrayed in the respective optical fiber fixing grooves 1a, the fixing member 43 for pressing the array-side optical fibers 2 against the optical-fiber-arraying-member 1 to fix them, the moving-side optical fiber 4 to be optically connected to either of the plurality of array-side optical fibers 2, the rotating device (carrying device) 11 for rotating the moving-side optical fiber 4, and the arraying-member rotating device 12 for rotating the optical-fiber-arraying-member 1.

The optical-fiber-arraying-member 41 is made of a material that permits the formation of the optical fiber fixing grooves 1a, such as the synthetic resin, glass, silicon, and so on. The cross-sectional shape of the optical fiber fixing grooves 1a is the V-shape and the axes of the respective grooves are arranged in parallel along the direction of the generator of the circular side face (cylindrical surface). The array-side optical fibers 2 are arrayed so that the ends 2a thereof are located on the same circumference, and they are fastened near the ends thereof by the fixing member 43 of the ring shape to be positioned and fixed to the optical-fiber-arraying-member 41. Although the array-side optical fibers 2 are illustrated only in part in FIG. 18, they are bundled behind the optical-fiber-arraying-member 41.

The rotating device 11 for rotating the moving-side optical fiber 4 includes the support member 11a functioning to support the moving-side optical fiber 4 and pressing it against the optical-fiber-arraying-member 41 and the motor 11b for rotating the support member 11a, as the device of the first embodiment did. The arraying-member rotating device 12 for rotating the optical-fiber-arraying-member 41 includes the rotational support shaft 12a for supporting the optical-fiber-arraying-member 41 and the motor 12b for rotating the rotational support shaft 12a.

For selectively optically connecting the moving-side optical fiber 4 to either of the array-side optical fibers 2 in the above structure, the arraying-member rotating device 12 is first actuated to rotate the optical-fiber-arraying-member 41 about the center axis to a desired position and select an array-side optical fiber 2 to be optically connected. Then the rotating device 11 is actuated to locate the moving-side optical fiber 4 in the corresponding fiber fixing groove 1a, so that the end of the moving-side optical fiber 4 is opposed to the end of the array-side optical fiber 2.

If the optical-fiber-arraying-member 41 is rotated over 360°, the bundle of array-side optical fibers 2 will be twisted undesirably. In order to prevent it, it is preferable to provide a mechanism for preventing the over rotation of the optical-fiber-arraying-member 41. A simple example is a method of providing a stopper. The matching solution may also be used on the occasion of optically connecting the moving-side optical fiber 4 to the array-side optical fiber 2. In another case, the whole of the optical-fiber-arraying-member 41 may be dipped in the matching solution.

In the present embodiment the optical-fiber-arraying-member 41 is rotated to select the array-side optical fiber 2 to be optically connected, but the optical switch may also be constructed in such structure that the moving-side optical fiber 4 is supported so as to be rotatable about a rotation axis passing the center axis of the optical-fiber-arraying-member 41 and that the moving-side optical-fiber 4 is rotated. In another configuration, the selection operation may be carried out by rotating both the optical-fiber-arraying-member 41 and the moving-side optical fiber 4 about the rotation axis passing the center axis of the optical-fiber-arraying-member 41.

With the optical switch 40 of the present embodiment, since the moving-side optical fiber 4 is optically connected to the array-side optical fiber 2 by rotating the moving-side optical fiber 4 and the optical-fiber-arraying-member 41 relative to each other about the center axis of the circular cylinder as described above, the moving-side optical fiber 4 does not have to be moved in parallel in the array direction of the array-side optical fibers 2, different from the optical switch using the optical-fiber-arraying-member of the type in which a plurality of optical fiber fixing grooves are formed in parallel on a flat plate. Namely, the use of the rotating mechanism eliminates the need for use of the ball screw, linear guide, etc. necessary for the parallel movement and permits attainment of compactification, simplification, and cost reduction of the mechanism for selectively optically connecting the optical fibers.

Thirteenth Embodiment

Figure 19:
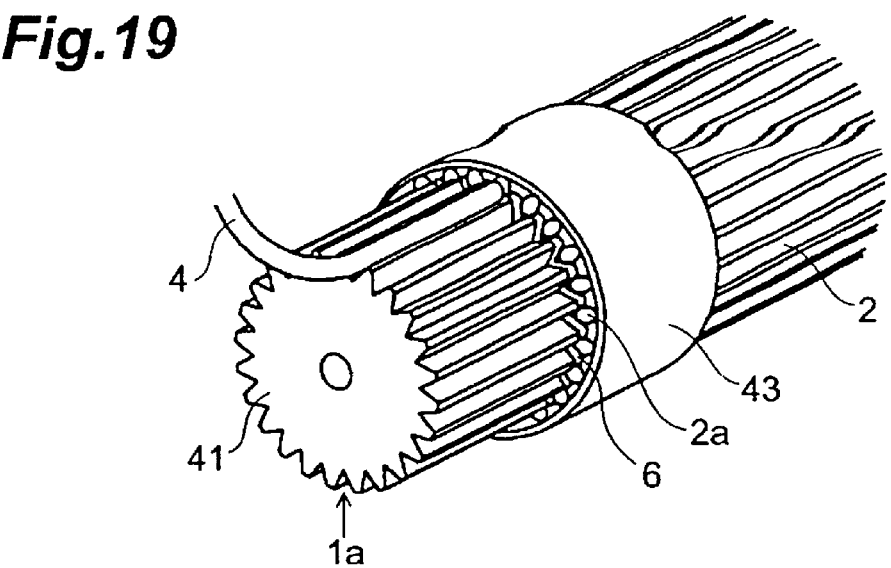
FIG. 19 is a diagram to show a thirteenth embodiment of the optical switch according to the present invention.
Figure 20:
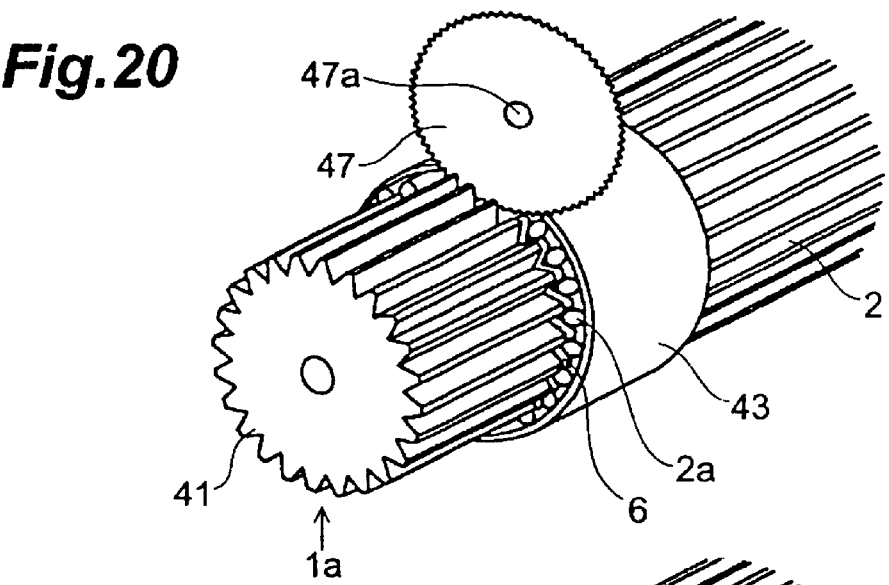
FIG. 20 is a diagram to show a production step of the optical switch of the thirteenth embodiment.

FIG. 19 is a diagram to show-the thirteenth embodiment of the optical switch according to the present invention and FIG. 20 is a diagram to show a production step of the optical switch in the present embodiment. The optical switch of the present embodiment illustrated in FIG. 19 is different in provision of the cut slit 6 from the optical switch of the twelfth embodiment. This cut slit 6 is formed when the ends of the respective array-side optical fibers 2 are cut to be aligned, and this will be described below with reference to FIG. 20. It is noted that FIG. 19 and FIG. 20 are illustrated without the illustration of the rotating device 11 for rotating the moving-side optical fiber and the arraying-member rotating device 12 for rotating the optical-fiber-arraying-member 41.

FIG. 20 shows a process of cutting the ends of the respective array-side optical fibers 2 to align them, among the production steps of the optical switch. The array-side optical fibers 2 are cut with the cutter 47 arranged to rotate about a rotation shaft 47a. Describing in more detail, the array-side optical fibers 2 are first arrayed in the optical fiber fixing grooves 1a of the optical-fiber-arraying-member 41 and then are pressed and fixed by the fixing member 43. Then the rotation shaft 47a of the cutter 47 is set in parallel to the center axis of the cylinder and the cutting of the array-side optical fibers 2 is started with the cutter 47. At this time, the cutting work is carried out with revolving the cutter 47 about the center axis of the optical-fiber-arraying-member 41. Through this cutting work, the end faces 2a of the respective array-side optical fibers 2 can be aligned on the same circumference of the cylindrical side face.

In the present embodiment, as described above, use of the cutter 47 permits improvement in the accuracy of mount position of each array-side optical fiber 2 and also permits polishing of the end faces together after the arraying of the array-side optical fibers 2, which eliminates the need for polishing of the end faces before the arraying.

The aforementioned cut slit 6 is made in the optical-fiber-arraying-member 41 during this cutting work. The cutting may also be carried out with rotating the optical-fiber-arraying-member 41 about its center axis, instead of revolving the cutter 47. Further, the relative movement between the optical-fiber-arraying-member 41 and the cutter 47 during the cutting is not limited to the above-stated movement to form the notch in the circular shape, but the relative movement may be linear movement to form the notch in a polygonal shape.

Fourteenth Embodiment

Figure 21:
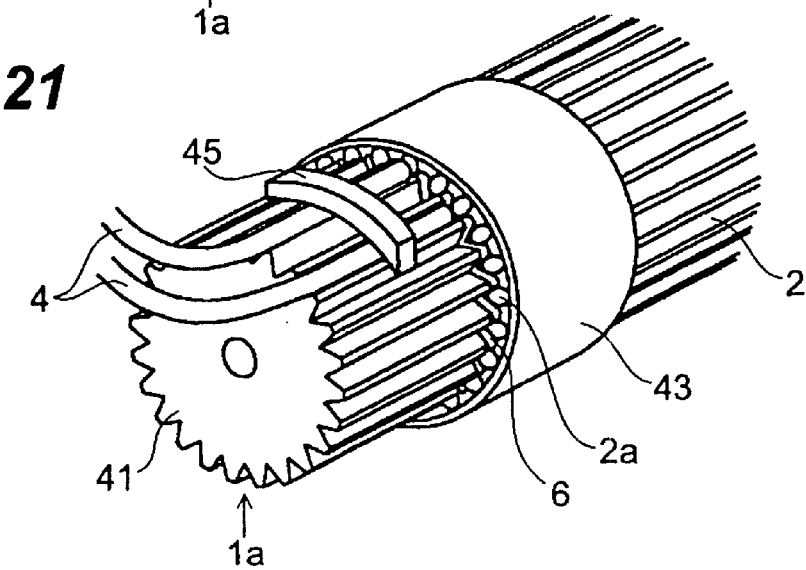
FIG. 21 is a diagram to show a fourteenth embodiment of the optical switch according to the present invention.

FIG. 21 is a diagram to show the fourteenth embodiment of the optical switch according to the present invention. The optical switch of the present embodiment is different from the optical switch of the thirteenth embodiment in that there are provided a plurality of moving-side optical fibers 4 and the holding member 45 for pressing each moving-side optical fiber 4 against the optical-fiber-arraying-member 41. The connection state can be stabilized by holding the optical fibers at the position near the connection points between the fibers by the holding member 45 in the optically connected state of each moving-side optical fiber 4 to the array-side optical fiber 2.

The holding member 45 is not coupled to the carrying device of the moving-side optical fibers 4 in the drawing, but it may also be constructed to be supported by the carrying device of the moving-side optical fibers 4. In the case where the number of moving-side optical fibers 4 to be pressed by the holding member 45 is large, i.e., where the width of the press area is large, the shape of the press surface of the holding member 45 is preferably part of the cylindrical side face having its center at the center of the optical-fiber-arraying-member 41. In other words, the radius of curvature of the press surface of the holding member 45 is preferably approximately equal to the radius of curvature of the cylinder. Further, the holding member 45 is preferably one for elastically pressing the moving-side optical fibers, as in the fifth embodiment and in the eighth embodiment.

The number of moving-side optical fibers 4 is two in the present embodiment, but can be one, or three or more. Further, when a plurality of moving-side optical fibers 4 are used, the moving-side optical fibers 4 may be located in adjacent optical fiber fixing grooves 1a or in separated optical fiber fixing grooves 1a as illustrated in FIG. 21. Either of these is properly selected depending upon the purpose of use. With use of the plurality of moving-side optical fibers 4, the plurality of moving-side optical fibers 4 may be integrally attached to one support member to constitute an optical fiber head. In this case, the plurality of moving-side optical fibers 4 can be simultaneously connected to the plurality of array-side optical fibers 2, which can decrease the time of connection tests and circuit tests.

Fifteenth Embodiment

Figure 22:
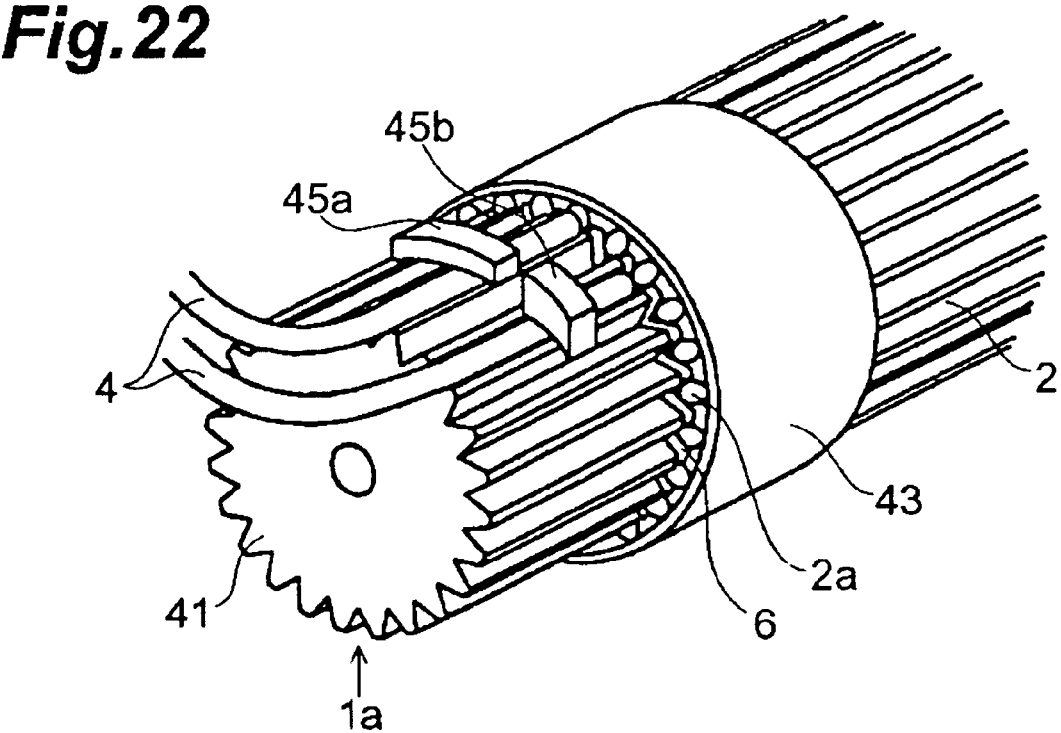
FIG. 22 is a diagram to show a fifteenth embodiment of the optical switch according to the present invention.

FIG. 22 is a diagram to show the fifteenth embodiment of the optical switch according to the present invention. The present embodiment is different from the fourteenth embodiment in that two holding members 45a, 45b press the respective moving-side optical fibers 4 against the optical-fiber-arraying-member 41. This configuration with the holding members 45a, 45b is advantageous in separately connecting the plurality of moving-side optical fibers 4 to the array-side optical fibers 2.

[Production Method of Optical-fiber-arraying-member]

Figure 23:
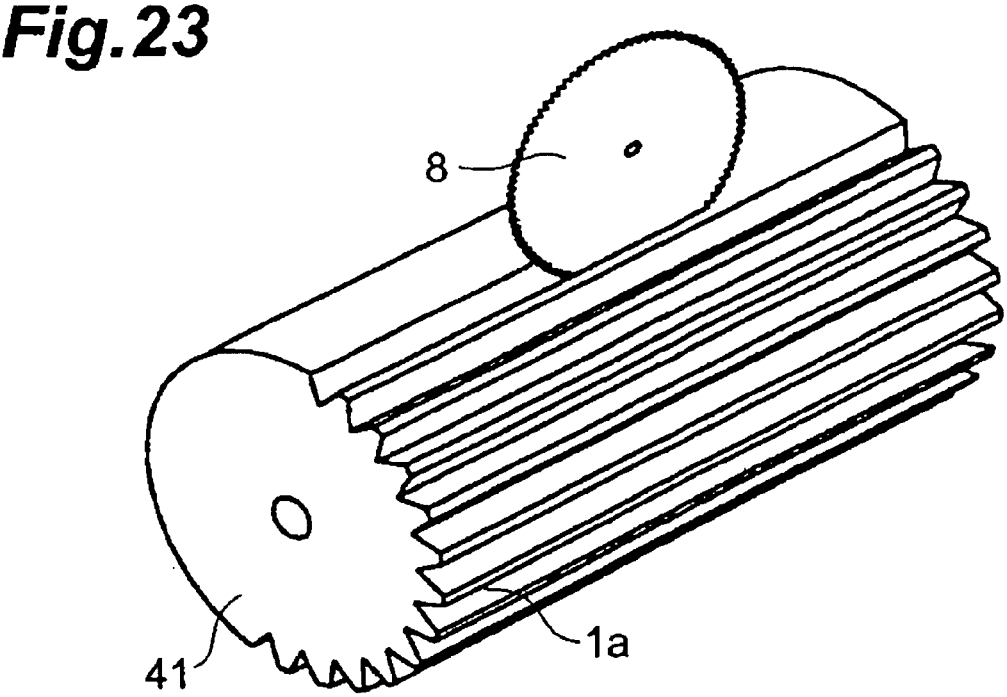
FIG. 23 is a diagram to show a production method of the optical-fiber-arraying-members used in the twelfth embodiment to the fifteenth embodiment.

FIG. 23 is a diagram to show a production method of the optical-fiber-arraying-members in the twelfth embodiment to the fifteenth embodiment. The cutter 8 is used in the method illustrated in FIG. 23, as in the production methods of the first embodiment and the sixth embodiment. With supporting the base material of the optical-fiber-arraying-member 41, the cutter 8 is moved along the generator direction of the cylindrical side face of the optical-fiber-arraying-member 41 to form an optical fiber fixing groove 1a of the V-shaped cross section. The cutter 8 is a rotary blade and the cross-sectional shape of the edge is one corresponding to the cross-sectional shape of the optical fiber fixing grooves 1a. The optical-fiber-arraying-member 41 is supported so as to be rotatable about the center axis of the cylinder. Then the optical-fiber-arraying-member 41 is rotated by a predetermined angle every formation of one optical fiber fixing groove 1a, and a new optical fiber fixing groove 1a is formed. By repeating this, the desired optical fiber fixing grooves 1a can be formed in parallel on the cylindrical side face of the optical-fiber-arraying-member 41.

If the optical-fiber-arraying-member 41 is rotated at intervals of a constant angle on this occasion, intervals of the respective optical fiber fixing grooves 1a thus formed will be constant. The angular intervals of the optical fiber fixing grooves 1a do not always have to be constant, if so desired. Instead of rotating the optical-fiber-arraying-member 41, the moving direction of the-cutter 8 may be rotated about the center axis of the cylinder, or the both may be rotated.

Sixteenth Embodiment

Figure 24:
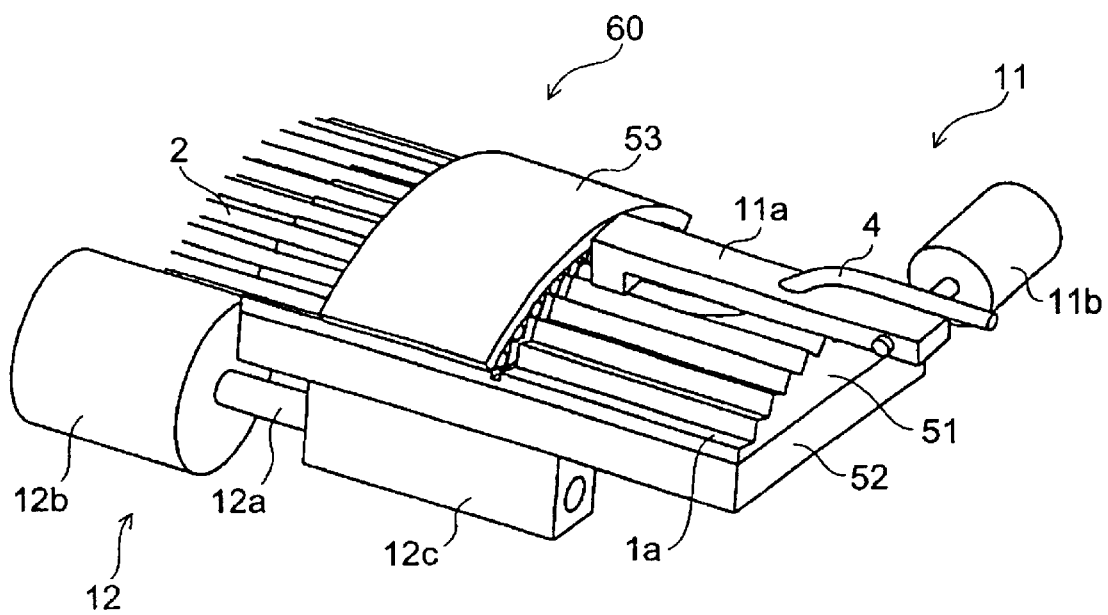
FIG. 24 is a diagram to show a sixteenth embodiment of the optical switch according to the present invention.

FIG. 24 is a diagram to show the sixteenth embodiment of the optical switch according to the present invention. The optical switch 60 of the present embodiment is different in the structure of the optical-fiber-arraying-member from the optical switches of the twelfth embodiment to the fifteenth embodiment. The twelfth embodiment to the fifteenth embodiment employed the optical-fiber-arraying-member 41 of the cylindrical shape, whereas the present embodiment employs the optical-fiber-arraying-member 51 having part of a cylindrical side face as its side face and has a plurality of optical fiber fixing grooves 1a formed along the generator direction of the side face.

The optical-fiber-arraying-member 51 is mounted on a base plate 52 of a rectangular prism shape and the base plate 52 is coupled to the arraying-member rotating device 12. The arraying-member rotating device 12 is composed of the rotational support shaft 12a, to which the support member 12c supporting the base plate 52 is attached at the distal end, and the motor 12b for rotating the rotational support shaft 12a. Further, the rotational support shaft 12a of the arraying-member rotating device 12 passes the center of the arc forming the outer periphery of the optical-fiber-arraying-member 51. Namely, when the arraying-member rotating device 12 is actuated, the optical-fiber-arraying-member 51 is arranged to rotate about the center axis of the cylinder. The rotating device 11 for rotating the moving-side optical fiber 4 is the same as that in the twelfth embodiment.

For selectively optically connecting the moving-side optical fiber 4 to either of the array-side optical fibers 2 in the above structure, the arraying-member rotating device 12 is first actuated to rotate the optical-fiber-arraying-member 1 to a desired position and select the array-side optical fiber 2 to be optically connected. Then the rotating device 11 is actuated to locate the moving-side optical fiber 4 in the corresponding fiber fixing groove 1a, so that the end of the moving-side optical fiber 4 is opposed to the end of the array-side optical fiber 2.

With the optical switch of the present embodiment, as described above, since the moving-side optical fiber 4 is optically connected to the array-side optical fiber 2 by rotating the moving-side optical fiber 4 and the optical-fiber-arraying-member 51 relative to each other about the center axis of the cylinder as in the twelfth embodiment, the moving-side optical fiber 4 does not have to be moved in parallel in the array direction of the array-side optical fibers 2, different from the optical switch using the optical-fiber-arraying-member of the type in which a plurality of optical fiber fixing grooves are formed in parallel on a flat plate. Namely, the use of the rotating mechanism eliminates the need for use of the ball screw, linear guide, etc. necessary for the parallel movement and thus permits attainment of compactification, simplification, and cost reduction of the mechanism for selectively optically connecting the optical fibers.

Figure 25:
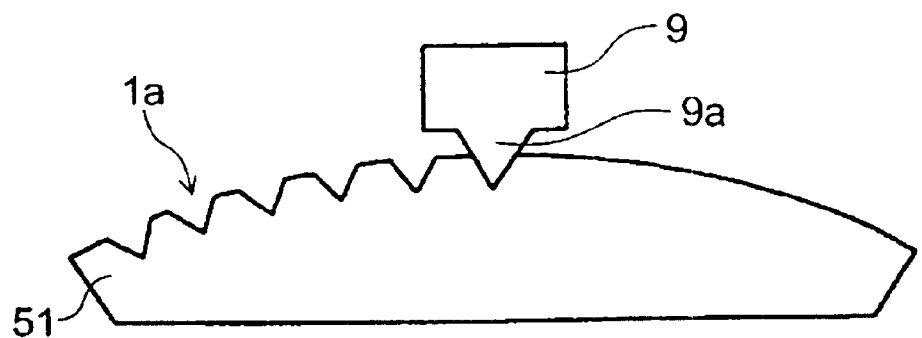
FIG. 25 is a diagram to show a process of forming optical fiber fixing grooves in the optical-fiber-arraying-member of the sixteenth embodiment.

Now, a production method of the optical switch of the sixteenth embodiment will be described below with reference to FIG. 25 and FIG. 26. FIG. 25 is a diagram to show a process of forming the optical fiber fixing grooves 1a in the optical-fiber-arraying-member 51. In this case, the stamp member 9 with the groove-forming rib 9a, similar to that in FIG. 8, is used. For forming an optical fiber fixing groove 1a, the rib 9a is pressed against the optical-fiber-arraying-member 51 so that the groove is formed along the generator direction of the cylindrical side face. After formation of one optical fiber fixing groove 1a, then at least one, either the stamp member 9 or the optical-fiber-arraying-member 51, is rotated about the axis of the cylinder and the rib 9a is again pressed against the optical-fiber-arraying-member 51. By repeating this plural times, the optical-fiber-arraying-member 51 is completed-with a plurality of optical fiber fixing grooves 1a formed in parallel. The bottoms of the respective optical fiber fixing grooves 1a are aligned on the circumference of a virtual circle having the center at the axis of the cylinder. The materials and characteristics-of the optical-fiber-arraying-member 51 and the stamp member 9 suitable for this method were already described in the description of FIG. 8 and thus are omitted herein.

The above described the production method of the optical-fiber-arraying-member 51 having part of the cylindrical side face (cylindrical surface) as its side face, but it is obvious that the stamp member 9 can also be applied to the production of the optical-fiber-arraying-member 41 of the cylindrical shape as described in the twelfth embodiment. Further, the method with the cutter 8 illustrated in FIG. 23 can also be employed for forming the plurality of optical fiber fixing grooves 1a in the optical-fiber-arraying-member 51.

Figure 26:
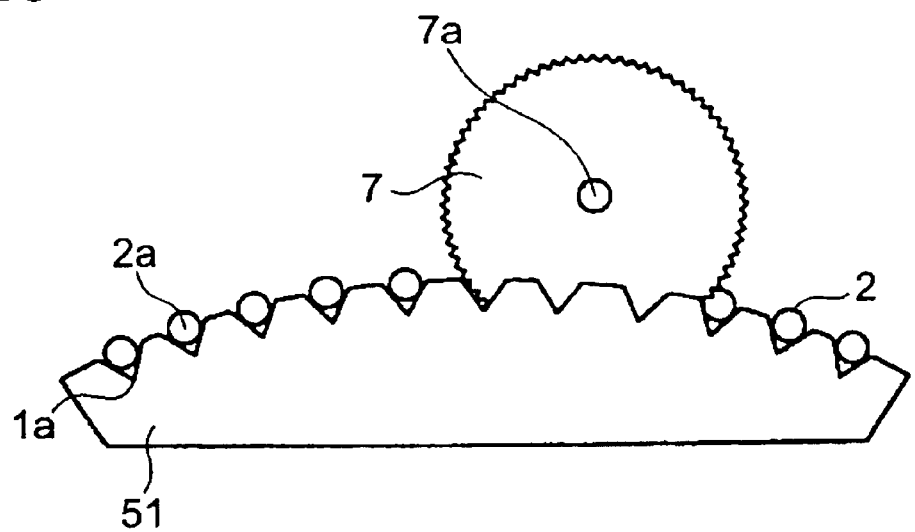
FIG. 26 is a diagram to show a process of cutting the ends of respective array-side optical fibers arrayed on the optical-fiber-arraying-member of the sixteenth embodiment to align them.

After completion of the production of the optical-fiber-arraying-member 51, the array-side optical fibers 2 are placed in the respective optical fiber fixing grooves 1a, as illustrated in FIG. 26. After that, while the cutter 7 is rotated about the rotation axis 7a to cut the array-side optical fibers 2 in fashion similar to the step described with FIG. 20, the rotation axis 7a of the cutter 7 is moved along the peripheral surface of the optical-fiber-arraying-member 51. Namely, the rotation axis 7a of the cutter 7 moves on an arc having the same center as the cylindrical side face of the optical-fiber-arraying-member 51, whereby the ends 2a of the respective array-side optical fibers 2 are cut to be aligned.

The movement of the rotation axis 7a of the cutter 7 may be linear movement parallel to the bottom surface of the optical-fiber-arraying-member 51 (the line in the lower portion of the drawing). In this case, the central part is cut deeper than the both sides are, but it will pose no significant problem. If the central angle of the peripheral surface is large, the cutter 7 may be moved along a plurality of lines so that lines formed by the cutting become polygonal, e.g., triangular or trapezoidal.

Seventeenth Embodiment

Figure 27A:
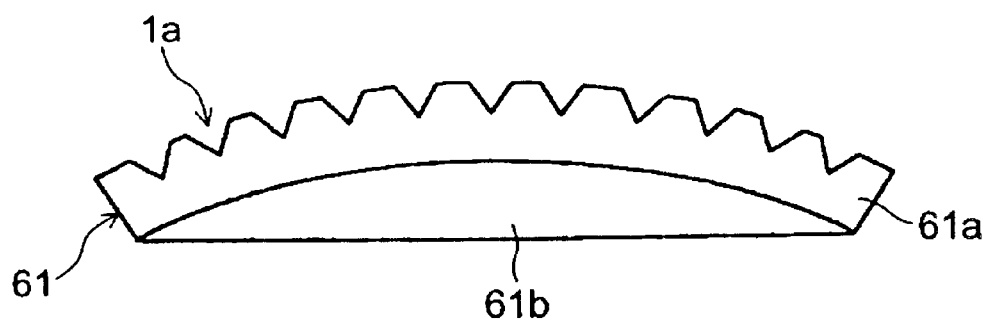
FIG. 27A is a diagram to show the optical-fiber-arraying-member applied to the seventeen embodiment of the optical switch according to the present invention.
Figure 27B:
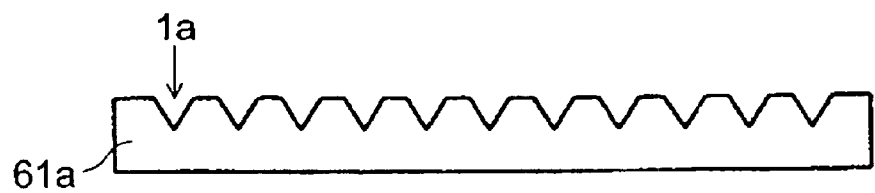
FIG. 27B is a diagram for explaining a production method of the optical-fiber-arraying-member of the seventeenth embodiment.

FIG. 27A is a diagram to show the optical-fiber-arraying-member 61 applied to the seventeenth embodiment of the optical switch according to the present invention and FIG. 27B a diagram for explaining a production method thereof. As illustrated in FIG. 27A, the optical-fiber-arraying-member 61 of the present embodiment is comprised of a groove forming part 61a, in which a plurality of optical fiber fixing grooves 1a are formed and which-has a curve shape, and a support member 61b the surface of which is bonded to the inner periphery surface of the groove forming part 61a.

For producing the optical-fiber-arraying-member 61 of the present embodiment, a plurality of optical fiber fixing grooves 1a of the V-shaped cross section are first formed in parallel in a base material of the flat plate shape, as illustrated in FIG. 27B. Of course, they can be formed by the method using the cutter described with FIG. 23. After completion of the formation of optical fiber fixing grooves 1a, the base material is then deformed so that the surface thereof becomes part of a cylindrical side face (cylindrical surface). At this time, depthwise directions of the optical fiber fixing grooves 1a are matched with the radial directions of the arc forming the cylindrical side face. After that, the above support member 61b is bonded to the inner peripheral surface of the groove forming part 61a, so as to maintain the shape of the groove forming part 61a.

Use of the optical-fiber-arraying-member 61 produced in this way also presents the effect similar to that of the optical switch of the sixteenth embodiment illustrated in FIG. 24. For producing the optical-fiber-arraying-member 61 of the present embodiment, the groove forming part 61a needs to be made of a deformable material.

Eighteenth Embodiment

Figure 28:
FIG. 28 is a diagram to show the optical-fiber-arraying-member applied to the eighteenth embodiment of the optical switch according to the present invention.

FIG. 28 is a diagram to show the optical-fiber-arraying-member 71 applied to the eighteenth embodiment of the optical switch according to the present invention. The optical-fiber-arraying-member 71 of the present-embodiment is different from the sixteenth embodiment in that the shape of the surface of the optical-fiber-arraying-member 71 is not equal to a cylindrical surface. In the present embodiment, however, depths of the respective optical fiber fixing grooves 1a are so different that the array-side optical fibers placed therein are located on a virtual cylindrical surface. With employment of this structure, the effect is similar to that of the sixteenth embodiment.

For producing the optical-fiber-arraying-member 71 of this type, the cutting work is first carried out by linearly moving the cutter of the cross-sectional shape corresponding to the V-grooves, to form one optical fiber fixing groove 1a. Then the cutter and the optical-fiber-arraying-member 71 are moved relative to each other in the direction perpendicular to the moving direction of the cutter during the cutting work. After that, the cutter is linearly moved again to form the second optical fiber fixing groove 1a. By repeating these steps plural times thereafter, a plurality of optical fiber fixing grooves 1a can be formed as illustrated in FIG. 28.

Nineteenth Embodiment

Figure 29:
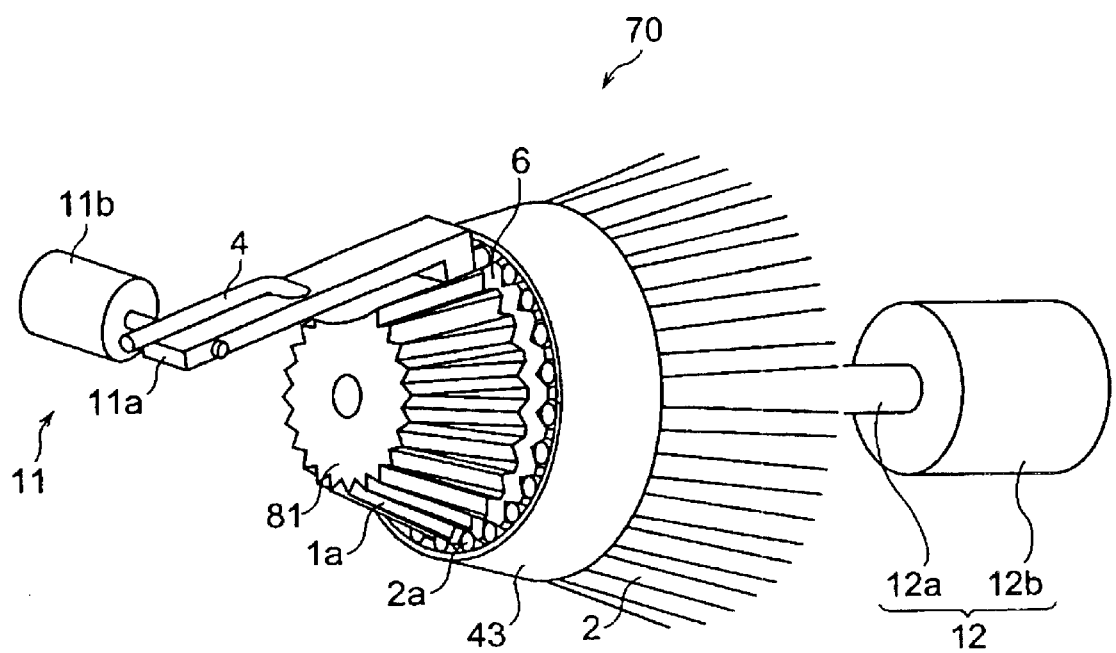
FIG. 29 is a diagram to show a nineteenth embodiment of the optical switch according to the present invention.

FIG. 29 is a diagram to show the nineteenth embodiment of the optical switch according to the present invention. The optical switch 70 of the present embodiment is different in use of the optical-fiber-arraying-member 81 in the shape of a frustum of circular cone from the twelfth embodiment illustrated in FIG. 18. The optical fiber fixing grooves 1a are formed along directions of the generator of the circular cone. Further, the array-side optical fibers 2 arrayed in the respective optical fiber fixing grooves 1a are placed so that their end faces 2a are directed toward the vertex of the cone. The optical switch 70 of the present embodiment can also present the effect similar to that of the twelfth embodiment. Since the frustum of circular cone is one obtained by simply truncating a circular cone, the circular cone stated in the present invention is used as a term including the frustum of circular cone.

Since the present embodiment is attained by simply changing the optical-fiber-arraying-member 41 of the cylindrical shape described in the twelfth embodiment to the fifteenth embodiment, into the shape of the frustum of circular cone, the present embodiment can accept application of the technique of pressing the moving-side optical fiber against the optical-fiber-arraying-member by the holding member, the methods of producing the optical-fiber-arraying-member with the cutter or with the stamp member, the method of cutting the ends of the respective array-side optical fibers by the cutter (the arraying method of optical fibers), etc., as the twelfth embodiment to the fifteenth embodiment did. Concerning the holding member, it is preferable to equate the radius of curvature of the press surface to the radius of curvature of the cone at the press position.

The optical connection between the moving-side optical fiber 4 and the array-side optical fiber 2 is also implemented in such a manner that the arraying-member rotating device 12 rotates the optical-fiber-arraying-member 81 about the center axis of the cone to select an array-side optical fiber 2 to be optically connected and that the rotating device 11 further rotates the moving-side optical fiber 4 to oppose it to the array-side optical fiber 2 selected, as in the twelfth embodiment.

From the same aspect as the sixteenth embodiment illustrated in FIG. 24, it is also possible to use the optical-fiber-arraying-member having part of the side face of the circular cone as a side surface thereof, instead of that having the side face of the circular cone (conical surface) itself as its own side face.

Figure 30:
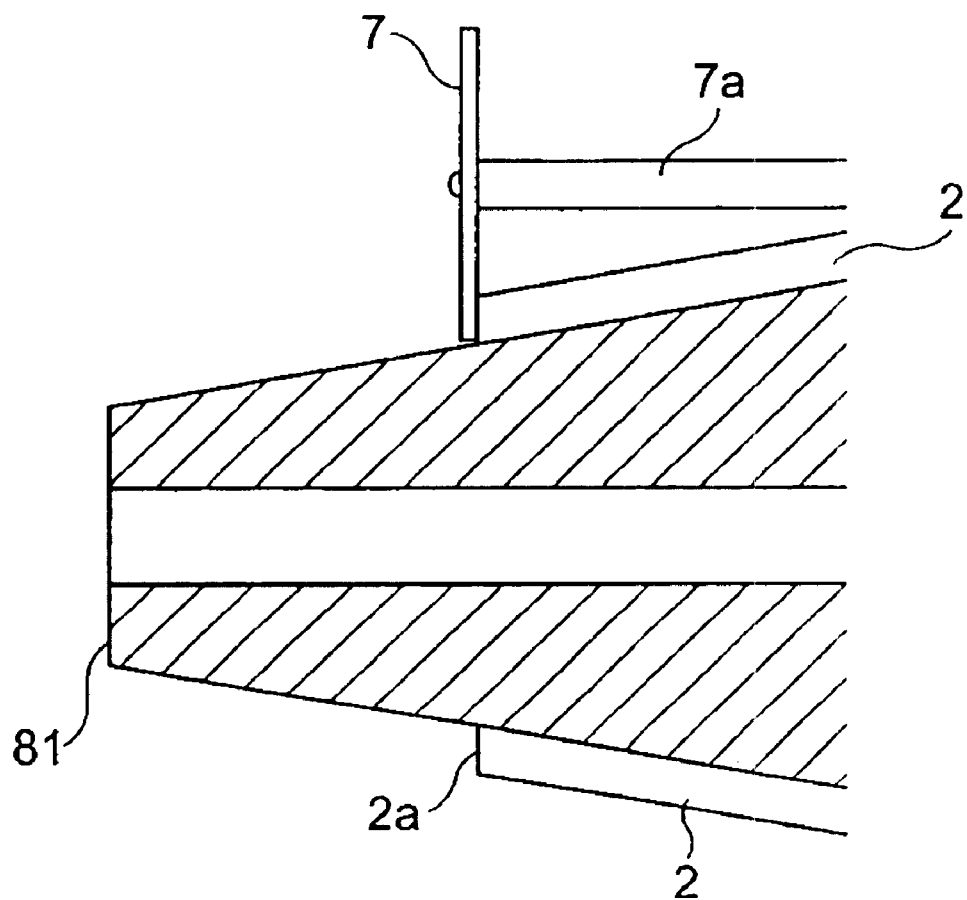
FIG. 30 is a diagram to show a process of cutting the ends of respective array-side optical fibers arrayed on the optical-fiber-arraying-member of the nineteenth embodiment to align them.

Further, if the technique of cutting the ends 2a of the array-side optical fibers 2 by the cutter is applied to the present embodiment and if on that occasion the rotation axis 7a of the cutter 7 is set in parallel to the center axis of the frustum of circular cone of the optical-fiber-arraying-member 81, the end faces 2a of the array-side optical fibers 2 become oblique to the axes thereof, as illustrated in FIG. 30. When the end faces 2a are oblique as in this case, light reflected by the end faces 2a can be prevented from returning in the array-side optical fibers 2. When the end faces 2a of the array-side optical fibers 2 are oblique, it is preferable to oppose the moving-side optical fiber 4 to the array-side optical fiber 2 at an angle according to refraction of light at the end face 2a of the array-side optical fiber 2, or to make the end face of the moving-side optical fiber 4 oblique.

Twentieth Embodiment

Figure 31:
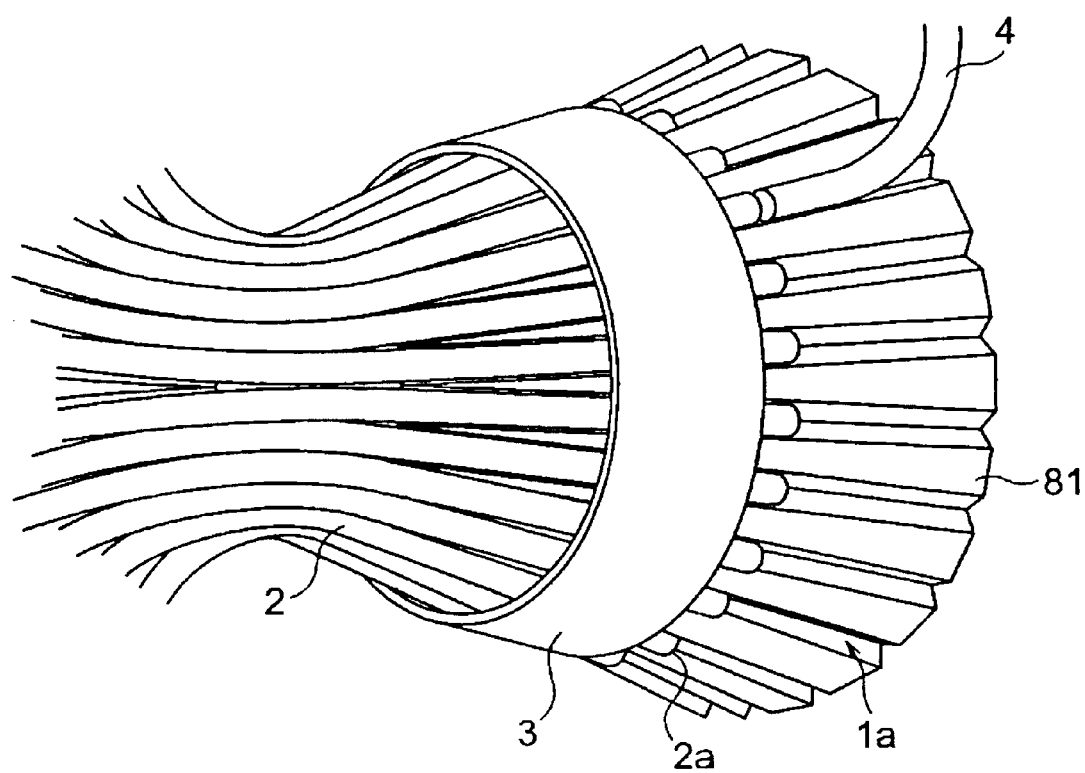
FIG. 31 is a diagram to show a twentieth embodiment of the optical switch according to the present invention.

FIG. 31 is a diagram to show the twentieth embodiment of the optical switch according to the present invention. The optical switch of the present embodiment is different in the array directions of the array-side optical fibers 2 from the optical switch of the nineteenth embodiment. In the present embodiment the array-side optical fibers 2 are arrayed so that the end faces 2a thereof are directed in directions opposite to those toward the vertex of the cone. This structure can also provide the effect similar to that of the twelfth embodiment and the nineteenth embodiment.

INDUSTRIAL UTILIZATION

As described above, with the optical switches according to the present invention, the moving-side optical fiber is optically connected to the array-side optical fiber by rotating the moving-side optical fiber and the optical-fiber-arraying-member with the plurality of optical fiber fixing grooves radially formed, relative to each other about the center axis of the virtual circle. This eliminates the need for the parallel movement of the moving-side optical fiber in the array direction of the array-side optical fiber, different from the optical switch using the optical-fiber-arraying-member of the type in which a plurality of optical fiber fixing grooves are formed in parallel on a flat plate, and it becomes feasible to substantiate the compactification and simplification of the mechanism for selectively optically connecting the optical fibers.

What is claimed is:

1. An optical switch comprising:
   an optical-fiber-arraying-member in which a plurality of optical fiber fixing grooves extending along radial directions of a virtual circle are radially formed in a predetermined surface of a base material;
   a plurality of array-side optical fibers arrayed in said plurality of optical fiber fixing grooves of said optical-fiber-arraying-member, said array-side optical fibers being arrayed so that end faces thereof are directed along directions opposite to those toward the center axis of said virtual circle;
   a moving-side optical fiber having an end thereof selectively optically connected to either of said plurality of array-side optical fibers and positioned on a respective one of said grooves;
   wherein said moving-side optical fiber and said optical-fiber-arraying member are rotated relative to each other about a center axis of said virtual circle to select said array-side optical fiber to be optically connected to said moving-side optical fiber.

2. The optical switch according to claim 1, comprising a carrying device for carrying said moving-side optical fiber, and an arraying-member rotating device for rotating said optical-fiber-arraying-member, wherein said moving-side optical fiber is optically connected to said array-side optical fiber by said carrying device and said arraying-member rotating device.

3. An optical switch comprising:
an optical-fiber-arraying-member in which a plurality of optical fiber fixing grooves extending along radial directions of a virtual circle are radially formed in a predetermined surface of a base material;
a plurality of array-side optical fibers arrayed in said plurality of optical fiber fixing grooves of said optical-fiber-arraying-member;
a moving-side optical fiber having an end thereof selectively optically connected to either of said plurality of array-side optical fibers and positioned on a respective one of said grooves;
wherein said moving-side optical fiber and said optical-fiber-arraying member are rotated relative to each other about a center axis of said virtual circle to select said array-side optical fiber to be optically connected to said moving-side optical fiber; and
wherein said base material is of a prism shape, said plurality of optical fiber fixing grooves are radially formed in at least two side faces of said base material, said base material and said moving-side optical fiber are rotated relative to each other about a center axis of the prism to select one side face of said base material, and said moving-side optical fiber is optically connected to either of said array-side optical fibers arrayed on said one side face selected.

4. The optical switch according to claim 3, comprising base-material rotating means for rotating said base material about the center axis of the prism, a carrying device for carrying said moving-side optical fiber, and a moving-side-fiber rotating device for rotating said moving-side optical fiber about the center axis of said virtual circle, wherein said moving-side optical fiber is optically connected to said array-side optical fiber by said base-material rotating means, said carrying device, and said moving-side-fiber rotating device.

5. An optical switch comprising:
an optical-fiber-arraying-member in which a plurality of optical fiber fixing grooves extending along radial directions of a virtual circle are radially formed in a predetermined surface of a base material;
a plurality of array-side optical fibers arrayed in said plurality of optical fiber fixing grooves of said optical-fiber-arraying-member;
a moving-side optical fiber having an end thereof selectively optically connected to either of said plurality of array-side optical fibers and positioned on a respective one of said grooves;
wherein said moving-side optical fiber and said optical-fiber-arraying member are rotated relative to each other about a center axis of said virtual circle to select said array-side optical fiber to be optically connected to said moving-side optical fiber; and
wherein said base material is of a pyramid shape, said plurality of optical fiber fixing grooves are radially formed in at least two side faces of said base material, said base material and said moving-side optical fiber are rotated relative to each other about a center axis of the pyramid to select one side face of said base material, and said moving-side optical fiber is optically connected to either of said array-side optical fibers arrayed on said one side face selected.

6. The optical switch according to claim 5, comprising base-material rotating means for rotating said base material about the center axis of the pyramid, a carrying device for carrying said moving-side optical fiber, and a moving-side-fiber rotating device for rotating said moving-side optical fiber about the center axis of said virtual circle, wherein said moving-side optical fiber is optically connected to said array-side optical fiber by said base-material rotating means, said carrying device, and said moving-side-fiber rotating device.

7. The optical switch according to claim 5, wherein said array-side optical fibers are arrayed so that end faces thereof are directed toward a vertex of the pyramid.

8. The optical switch according to claim 5, wherein said array-side optical fibers are arrayed so that end faces thereof are directed along directions opposite to those toward a vertex of the pyramid.

9. An optical switch comprising:
an optical-fiber-arraying-member in which a plurality of optical fiber fixing grooves extending along radial directions of a virtual circle are radially formed in a predetermined surface of a base material;
a plurality of array-side optical fibers arrayed in said plurality of optical fiber fixing grooves of said optical-fiber-arraying-member;
a moving-side optical fiber having an end thereof selectively optically connected to either of said plurality of array-side optical fibers and positioned on a respective one of said grooves;
wherein said moving-side optical fiber and said optical-fiber-arraying member are rotated relative to each other about a center axis of said virtual circle to select said array-side optical fiber to be optically connected to said moving-side optical fiber; and
wherein said moving-side optical fiber comprises a plurality of optical fibers and each moving-side optical fiber is positioned on said optical-fiber-arraying-member by a pressing member having an arcuate outer periphery and having the same center as said virtual circle.

10. An optical switch comprising:
an optical-fiber-arraying-member in which a plurality of optical fiber fixing grooves are formed along a direction of a generator of a cylindrical side face of a base material, which has one of the cylindrical side surface and part of the cylindrical side surface as its own side face;
a plurality of array-side optical fibers arrayed in said plurality of optical fiber fixing grooves of said optical-fiber-arraying-member; and
a moving-side optical fiber having an end thereof to be selectively optically connected to either of said plurality of array-side optical fibers and positioned on a respective one of said grooves;
wherein said moving-side optical fiber and said optical-fiber-arraying member are rotated relative to each other about a center axis of said cylinder and said moving-side optical fiber is optically connected to said array-side optical fiber.

11. The optical switch according to claim 10, comprising a carrying device for carrying said moving-side optical fiber, and an arraying-member rotating device for rotating said optical-fiber-arraying-member about the center axis of the cylinder, wherein said moving-side optical fiber is selectively optically fiber by said carrying device and said arraying-member rotating device.

12. The optical switch according to claim 10, wherein said moving-side optical fiber comprises a plurality of optical fibers, each moving-side optical fiber is positioned on said optical-fiber-arraying-member by a pressing member having a curved press surface, and a radius of curvature of said curved press surface is approximately equal to a radius of curvature of said cylinder.

13. An optical switch comprising:
an optical-fiber-arraying-member in which a plurality of optical fiber fixing grooves are formed along a direction of a generator of a conical side face of a base material, which has one of the conical side face and part of the conical side face as its own side face;
a plurality of array-side optical fibers arrayed in said plurality of optical fiber fixing grooves of said optical-fiber-arraying-member; and
a moving-side optical fiber having an end thereof to be selectively optically connected to either of said plurality of array-side optical fibers and positioned on a respective one of said grooves;
wherein said moving-side optical fiber and said optical-fiber-arraying member are rotated relative to each other about a center axis of said cylinder and said moving-side optical fiber is optically connected to said array-side optical fiber.

14. The optical switch according to claim 13, comprising a carrying device for carrying said moving-side optical fiber, and an arraying-member rotating device for rotating said optical-fiber-arraying-member about the center axis of the cone, wherein said moving-side optical fiber is selectively optically connected to said array-side optical fiber by said carrying device and said arraying-member rotating device.

15. The optical switch according to claim 13, wherein said array-side optical fibers are arrayed so that end faces thereof are directed toward a vertex of the cone.

16. The optical switch according to claim 13, wherein said array-side optical fibers are arrayed so that end faces thereof are directed along directions opposite to those toward a vertex of the cone.

17. The optical switch according to claim 13, wherein said moving-side optical fiber comprises a plurality of optical fibers, each moving-side optical fiber is positioned on said optical-fiber-arraying-member by a pressing member having a curved press surface, and a radius of curvature of said curved press surface is approximately equal to a radius of curvature of said cone at a press position.

18. A method of producing an optical-fiber-arraying-member, comprising a process of alternately repeating plural times a step of forming an optical fiber fixing groove in a predetermined surface of a base material by linearly moving a cutting tool along a radial direction of a virtual circle and a step of rotating said base material and the moving direction of said cutting tool relative to each other by a predetermined angle about a center axis of said virtual circle, thereby radially forming a plurality of optical fiber fixing grooves in said base material; and
wherein said base material is of a prism shape and said base material and said cutting tool are rotated relative to each other about a center axis of the prism to determine a side face of said base material in which said optical fiber fixing grooves are to be formed.

19. A method of producing an optical-fiber-arraying-member, comprising a process of alternately repeating plural times a step of forming an optical fiber fixing groove in a predetermined surface of a base material by linearly moving a cutting tool along a radial direction of a virtual circle and a step of rotating said base material and the moving direction of said cutting tool relative to each other by a predetermined angle about a center axis of said virtual circle, thereby radially forming a plurality of optical fiber fixing grooves in said base material; and
wherein said base material is of a pyramid shape and said base material and said cutting tool are rotated relative to each other about a center axis of the pyramid to determine a side face of said base material in which said optical fiber fixing grooves are to be formed.

20. A method of producing an optical-fiber-arraying-member, comprising a process of alternately repeating plural times a step of moving a cutting tool along a direction of a generator of a cylindrical side surface of a base material, which has one of the cylindrical side face and part of the cylindrical side face as its own side face, to form an optical fiber fixing groove in said base material and a step of rotating said cutting tool and said base material relative to each other by a predetermined angle about a center axis of said cylinder, thereby forming a plurality of optical fiber fixing grooves parallel to each other on the cylindrical side face of said base material.

21. A method of producing an optical-fiber-arraying-member, comprising a process of alternately repeating plural times a step of linearly moving a cutting tool along one direction of a base material to form an optical fiber fixing groove in a predetermined surface of the base material and a step of moving the moving direction of said cutting tool and said base material relative to each other in a direction perpendicular to said one direction, thereby forming a plurality of optical fiber fixing grooves parallel to each other in said base material, wherein bottoms of said respective fiber fixing grooves are located on a side face of a virtual cylinder.

22. A method of producing an optical-fiber-arraying-member, comprising a process of alternately repeating plural times a step of moving a cutting tool along a direction of a generator of a conical side face of a base material, which has one of the conical side face and part of the conical side face as its own side face, to form an optical fiber fixing groove in said base material and a step of rotating said cutting tool and said base material relative to each other by a predetermined angle about a center axis of said cone, thereby forming a plurality of optical fiber fixing grooves on the conical side face of said base material.

23. A method of arraying optical fibers, comprising:
a step of preparing an optical-fiber-arraying-member in which a plurality of optical fiber fixing grooves extending along radial directions of a virtual circle are radially formed in a predetermined surface of a base material;
a step of arraying and fixing a plurality of array-side optical fibers to be optically connected to a moving-side optical fiber, in said plurality of optical fiber fixing grooves, wherein an edge of the moving-side optical fiber is positioned in a respective one of said grooves; and
a step of rotating a cylindrical edge of a cylindrical shape about a center axis of said virtual circle to cut ends of said plurality of array-side optical fibers to align the ends.

24. The method of arraying optical fibers according to claim 23, wherein said base material is of a prism shape, said plurality of optical fiber fixing grooves are radially formed in at least two side faces of the base material, said base material and said cylindrical edge are rotated relative to each other about a center axis of the prism to select one side face, and ends of the array-side optical fibers arrayed on said one side face selected are cut to be aligned by said cylindrical edge.

25. The method of arraying optical fibers according to claim 23, wherein said base material is of a pyramid shape, said plurality of optical fiber fixing grooves are radially formed in at least two side faces of the base material, said base material and said cylindrical edge are rotated relative to each other about a center axis of the pyramid to select one side face, and ends of array-side optical fibers arrayed on said one side face selected are cut to be aligned by said cylindrical edge.

26. A method of arraying optical fibers, comprising:

a step of preparing an optical-fiber-arraying-member in which a plurality of optical fiber fixing grooves extending along a direction of a generator of a cylindrical side face of a base material, which has one of the cylindrical side face and part of the cylindrical side face as its own side face, are formed in parallel to each other;

a step of arraying and fixing a plurality of array-side optical fibers to be optically connected to a moving-side optical fiber, in said plurality of optical fiber fixing grooves, wherein an edge of the moving-side optical fiber is positioned in a respective one of said grooves; and a step of rotating a rotary blade having a rotation axis parallel to a center axis of said cylinder and rotating said base material and said rotary blade relative to each other about the center axis of said cylinder, thereby cutting ends of said plurality of array-side optical fibers to align the ends.

27. A method of arraying optical fibers, comprising:

a step of preparing an optical-fiber-arraying-member in which a plurality of optical fiber fixing grooves extending along directions of a generator of a conical side face of a base material, which has one of the conical side face and part of the conical side face as its own side face, are formed;

a step of arraying and fixing a plurality of array-side optical fibers to be optically connected to a moving-side optical fiber, in said plurality of optical fiber fixing grooves, wherein an edge of the moving-side optical fiber is positioned in a respective one of said grooves; and a step of rotating a rotary blade having a rotation axis parallel to a center axis of said cone and rotating said base material and said rotary blade relative to each other about the center axis of said cone, thereby cutting ends of said plurality of array-side optical fibers to align the ends.

28. A method of producing an optical-fiber-arraying-member, comprising a process of alternately repeating plural times a step of forming an optical fiber fixing groove in a predetermined surface of a base material by linearly moving a cutting tool along a radial direction of a virtual circle and a step of rotating said base material and the moving direction of said cutting tool relative to each other by a predetermined angle about a center axis of said virtual circle, thereby radially forming a plurality of optical fiber fixing grooves in said base material; and wherein said optical fiber fixing groove formed in said step of forming is V-shaped.

29. A method for producing a member with array-side optical fibers, comprising:

a step of preparing an optical-fiber-arraying-member in which a plurality of optical fiber fixing grooves extending along radial directions of a virtual circle are radially formed in a predetermined surface of a base material;

a step of arraying and fixing a plurality of array-side optical fibers to be optically connected to a moving-side optical fiber, in said plurality of optical fiber fixing grooves; and a step of cutting ends of said plurality of array-side optical fibers to align the ends;

wherein the member with array-side fibers is applied to an optical switch in which an end of a moving-side optical fiber is positioned on the groove so as to be optically connected to the array-side optical fiber.

30. A method according to claim 29, wherein the ends of said plurality of array-side optical fibers are cut by rotating a cylindrical edge of a cylindrical shape about a center axis of said virtual circle.

* * * * *